United States Patent
Yagiura

(10) Patent No.: US 10,078,479 B2
(45) Date of Patent: Sep. 18, 2018

(54) PRINTING PROCESS SYSTEM AND INFORMATION PROCESSING APPARATUS

(71) Applicant: Yutaka Yagiura, Kanagawa (JP)

(72) Inventor: Yutaka Yagiura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/599,540

(22) Filed: May 19, 2017

(65) Prior Publication Data
US 2017/0344326 A1    Nov. 30, 2017

(30) Foreign Application Priority Data

May 25, 2016 (JP) .................................. 2016-104384
Apr. 24, 2017 (JP) .................................. 2017-085162

(51) Int. Cl.
*G06F 3/12* (2006.01)
*H04N 1/00* (2006.01)

(52) U.S. Cl.
CPC ....... *G06F 3/1292* (2013.01); *H04N 1/00233* (2013.01); *G06F 3/1271* (2013.01)

(58) Field of Classification Search
CPC ...... G06F 3/1292; G06F 3/1454; G06F 3/162; H04N 1/00183; H04N 1/00196; H04N 1/00198; H04N 1/00214; H04N 1/00233; H04N 1/00411; H04N 1/00456; H04N 1/00464; H04N 1/32106; H04N 1/448; G06K 9/6217
USPC ....... 709/204, 203, 201, 202, 205, 206, 231; 382/103, 100, 159, 195; 358/1.13, 3.01
See application file for complete search history.

(56) References Cited

U.S. PATENT DOCUMENTS

| | | | |
|---|---|---|---|
| 9,578,207 B1* | 2/2017 | Andree | H04N 1/4052 |
| 2005/0273620 A1* | 12/2005 | Kawabata | G06F 21/608 |
| | | | 713/182 |
| 2011/0063667 A1* | 3/2011 | Nishida | G06F 3/1222 |
| | | | 358/1.15 |
| 2011/0205585 A1* | 8/2011 | Mihara | G06F 3/1203 |
| | | | 358/1.15 |
| 2012/0300254 A1* | 11/2012 | Kato | G06F 3/1229 |
| | | | 358/1.15 |
| 2012/0327463 A1* | 12/2012 | Mizuno | G06F 3/122 |
| | | | 358/1.15 |

(Continued)

FOREIGN PATENT DOCUMENTS

| | | |
|---|---|---|
| JP | 2006-244321 | 9/2006 |
| JP | 2009-020911 | 1/2009 |

*Primary Examiner* — Negussie Worku
(74) *Attorney, Agent, or Firm* — IPUSA, PLLC

(57) ABSTRACT

A printing process system includes processing circuitry configured to render content to generate image data to be used for displaying the content by a web browser; accept a print instruction to print out the content, which is displayed by the web browser by using the generated image data, the print instruction being input by a user via a display device coupled to the printing process system; and convert the image data, which is the same as the image data used for displaying the content by the web browser, into page description language data, and output the page description language data to a printer configured to output printed matter on which an image, which matches an image of the content displayed by the web browser, is printed based on the page description language data.

8 Claims, 20 Drawing Sheets

(56) References Cited

U.S. PATENT DOCUMENTS

| | | | |
|---|---|---|---|
| 2013/0100470 A1* | 4/2013 | Kumagai | H04N 1/46 358/1.9 |
| 2013/0194633 A1* | 8/2013 | Takatsu | G06F 3/1211 358/1.15 |
| 2013/0242342 A1* | 9/2013 | Kawakami | G06Q 30/04 358/1.15 |
| 2015/0015908 A1* | 1/2015 | Tanaka | G06K 15/4095 358/1.14 |
| 2015/0146224 A1* | 5/2015 | Shimamura | H04N 1/00082 358/1.13 |
| 2015/0220817 A1* | 8/2015 | Kujirai | G06K 15/021 358/1.15 |
| 2015/0248258 A1* | 9/2015 | Ding | G06F 3/1222 358/1.15 |
| 2015/0249752 A1* | 9/2015 | Imai | H04N 1/00042 358/1.15 |
| 2015/0327172 A1* | 11/2015 | Kusakabe | H04W 52/0229 370/331 |
| 2016/0182762 A1* | 6/2016 | Eum | H04N 1/4413 358/1.14 |
| 2016/0187832 A1* | 6/2016 | Kanamoto | G03G 15/6544 399/408 |
| 2017/0004147 A1* | 1/2017 | Ozawa | H04N 1/2191 |
| 2017/0019569 A1* | 1/2017 | Arakawa | H04N 1/62 |
| 2017/0337021 A1* | 11/2017 | Fukuda | G06F 3/1268 |

\* cited by examiner

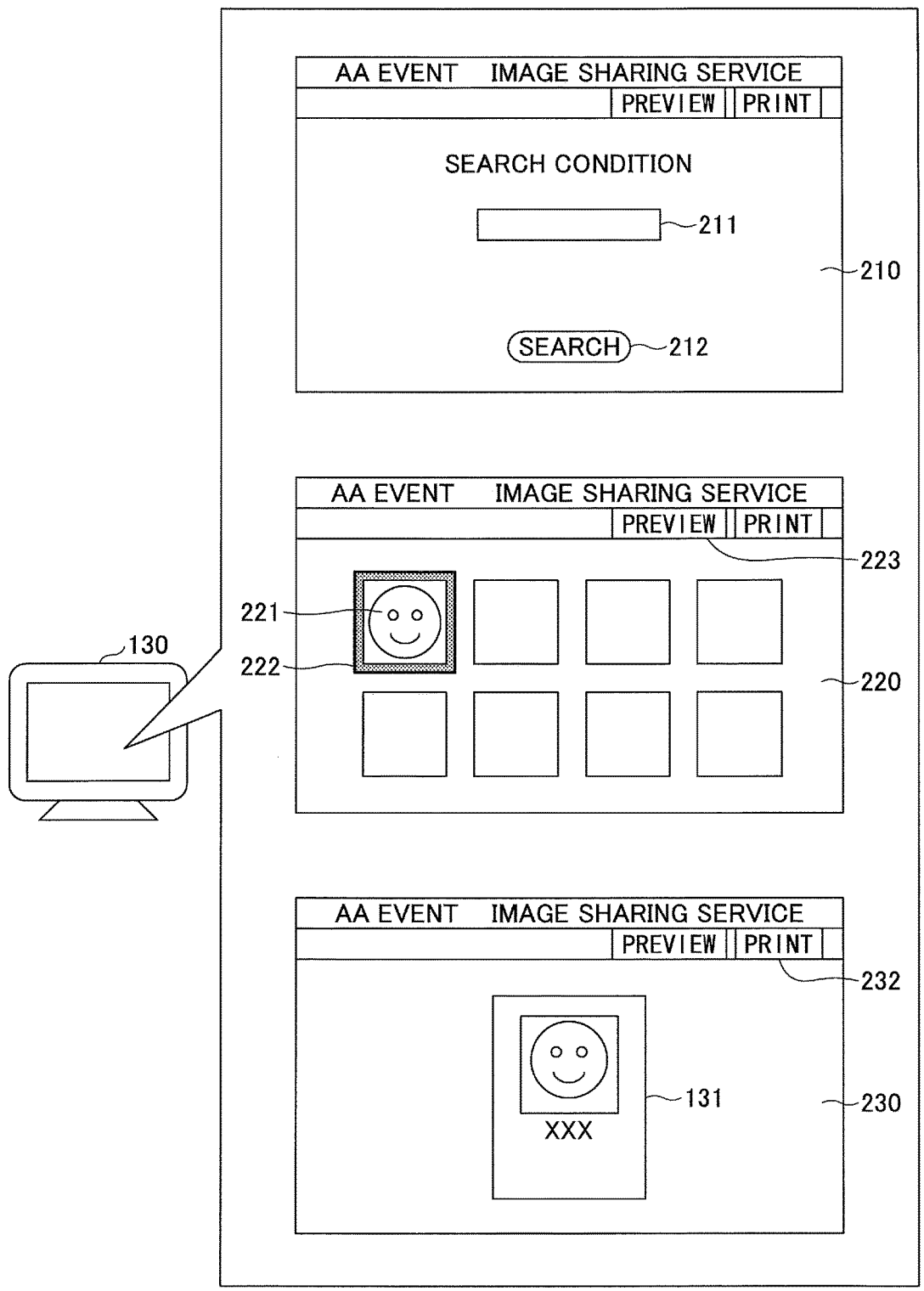

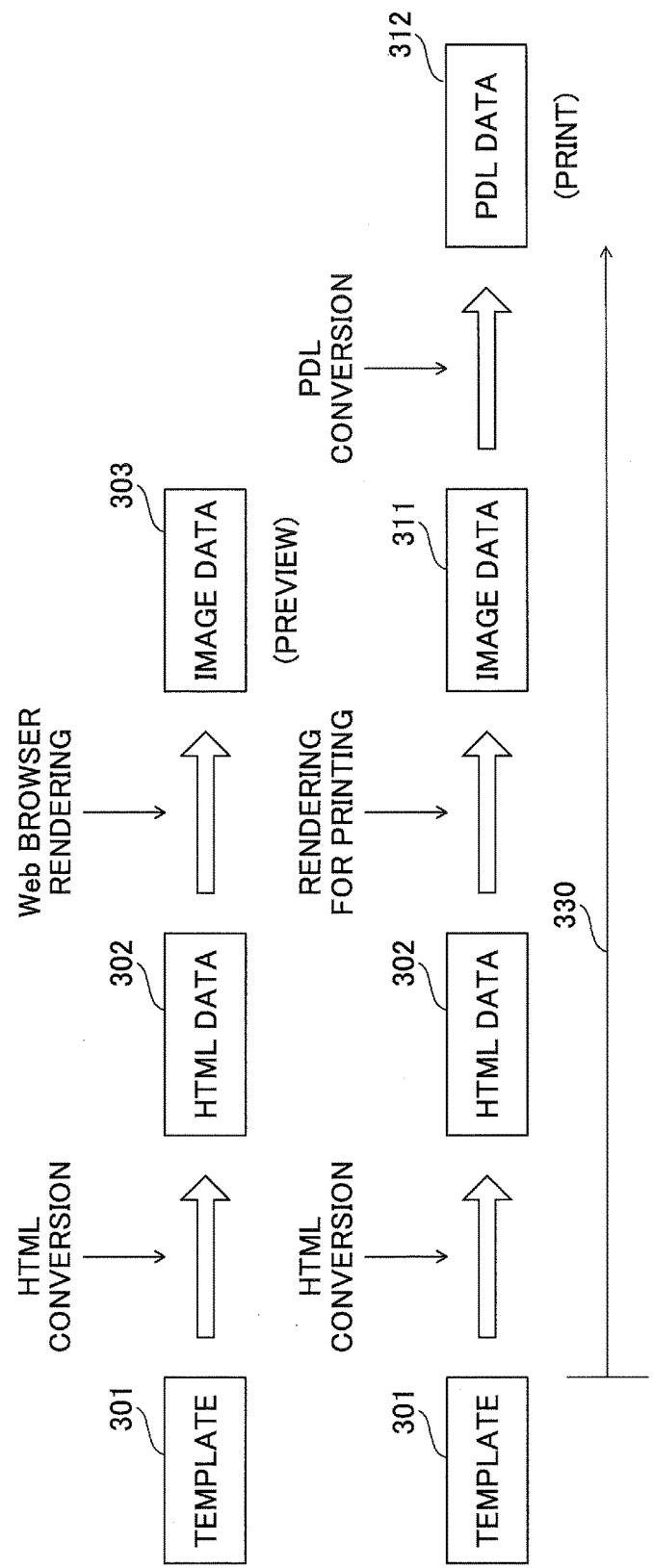

FIG.4A

```
<!DOCTYPE html>
<html>
<head>
<style type="text/css">
<!--
#container{
box-sizing:border-box;
...
}
.photo{
filter:sepia(0.4)saturate(2.4)brightness(1.3)contrast(1);
}
-->
</style>
</head>
<body>
<div id='container'>
<img src='<%-@imageURL %>'class='photo objectFit-contain'>
<img src='<%-@logoURL%>'class='logo'>
</div>
</body>
</html>
```

```
<!DOCTYPE html>
<html>
<head>
<style type="text/css">
<!--
#container{
box-sizing:border-box;
...
}
.photo{
filter:sepia(0.4)saturate(2.4)brightness(1.3)contrast(1);
}
-->
</style>
</head>
<body>
<div id='container'>
<img src='<%-http://www.photoservice.com/photo.png %>' class='photo objectFit-contain'>   401
<img src='<%-http://www.XXX.com/logo.png %>' class='logo'>   402
</div>
</body>
</html>
```

FIG.17

| TYPE OF Web BROWSER | VERSION OF Web BROWSER | TYPE OF RENDERER UNIT OF Web BROWSER |
|---|---|---|
| Web BROWSER I | Ver1 | RENDERER P |
| | Ver2 | RENDERER Q |
| Web BROWSER II | Ver1 | RENDERER M |
| | Ver2 | |
| | Ver3 | |
| | Ver4 | RENDERER N |

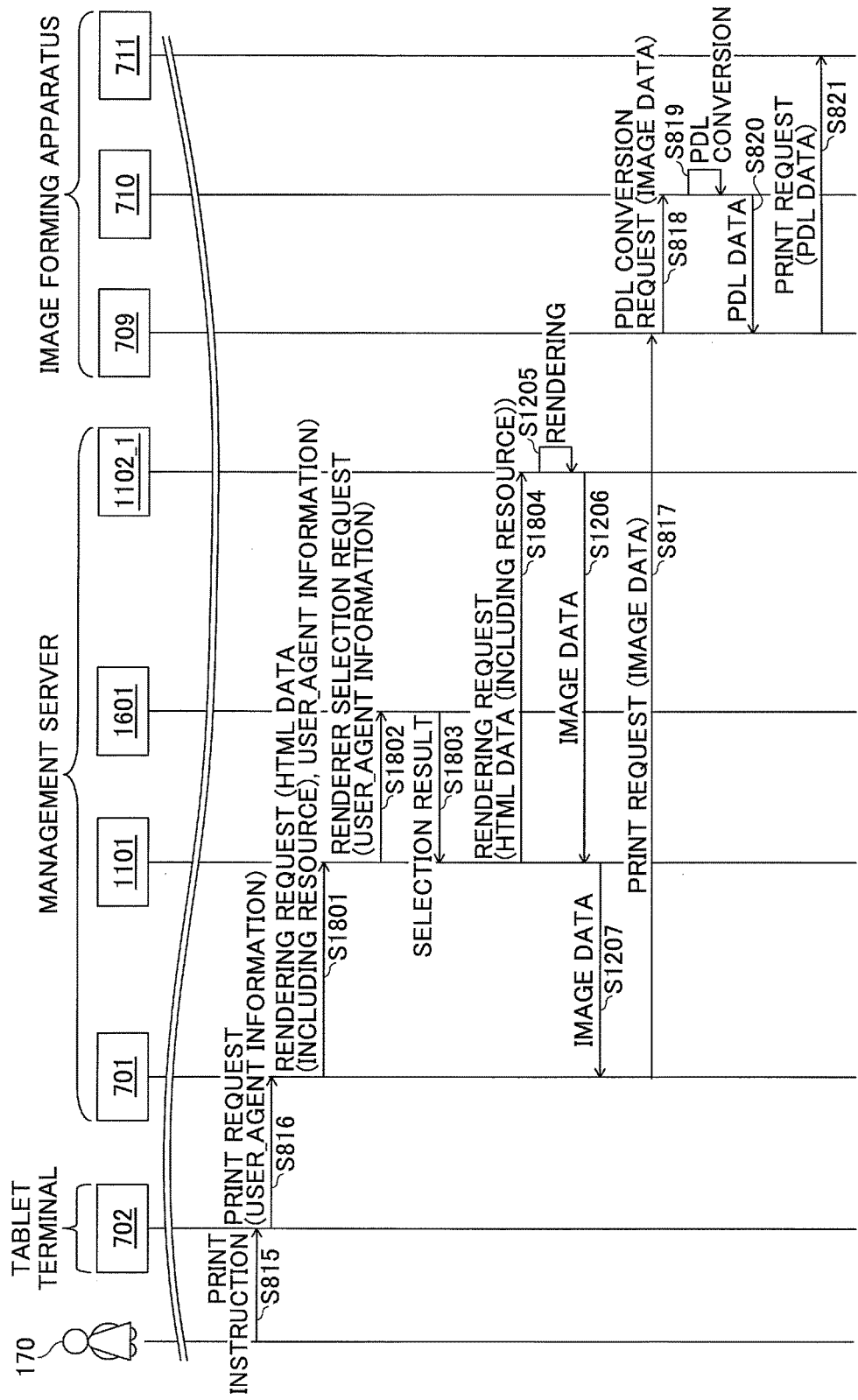

PRINTING PROCESS SYSTEM AND INFORMATION PROCESSING APPARATUS

CROSS-REFERENCE TO RELATED APPLICATION

The present application claims priority under 35 U.S.C. § 119 to Japanese Patent Application No. 2016-104384, filed on May 25, 2016 and Japanese Patent Application No. 2017-085162, filed on Apr. 24, 2017, the contents of which are incorporated herein by reference in their entirety.

BACKGROUND OF THE INVENTION

1. Field of the Invention

The present invention relates to a printing process system and an information processing apparatus.

2. Description of the Related Art

In the related art, there is known an image sharing service of uploading a captured image, which is captured by using a mobile terminal, etc., to a web server via the Internet, and sharing the captured image with other users.

The image sharing service may be used via an exclusive-use application. Also, recently, the image sharing service can be used via a web browser. Therefore, for example, it is possible to add functions to the image sharing service. An example of the functions is a function of downloading the captured image, which has been uploaded, via the web browser, inserting the captured image in a predetermined content, and displaying the captured image together with the predetermined content on a display screen. Another example of the functions is a function of printing out the content by a printing device.

Patent Document 1: Japanese Unexamined Patent Application Publication No. 2009-20911

SUMMARY OF THE INVENTION

An aspect of the present invention provides a printing process system and an information processing apparatus in which one or more of the disadvantages of the related art are reduced.

According to one aspect of the present invention, there is provided a printing process system including processing circuitry configured to render content to generate image data to be used for displaying the content by a web browser; accept a print instruction to print out the content, which is displayed by the web browser by using the generated image data, the print instruction being input by a user via a display device coupled to the printing process system; and convert the image data, which is the same as the image data used for displaying the content by the web browser, into page description language data, and output the page description language data to a printer configured to output printed matter on which an image, which matches an image of the content displayed by the web browser, is printed based on the page description language data.

BRIEF DESCRIPTION OF THE DRAWINGS

Other objects, features and advantages of the present invention will become more apparent from the following detailed description when read in conjunction with the accompanying drawings, in which:

FIG. 2 illustrates the transition of a display screen of a printing process system according to the first embodiment of the present invention;

FIG. 3A illustrates an overview of an image forming process in a printing process system of the related art;

FIG. 4A illustrates an example of a template according to the first embodiment of the present invention;

FIG. 4B illustrates an example of HTML data according to the first embodiment of the present invention;

FIG. 17 is a diagram indicating the types of renderers according to the fourth embodiment of the present invention; and FIG. 18 is a fourth sequence diagram illustrating the flow of an image forming process in the printing process system according to the fourth embodiment of the present invention.

DETAILED DESCRIPTION OF THE PREFERRED EMBODIMENTS

Figure 1:
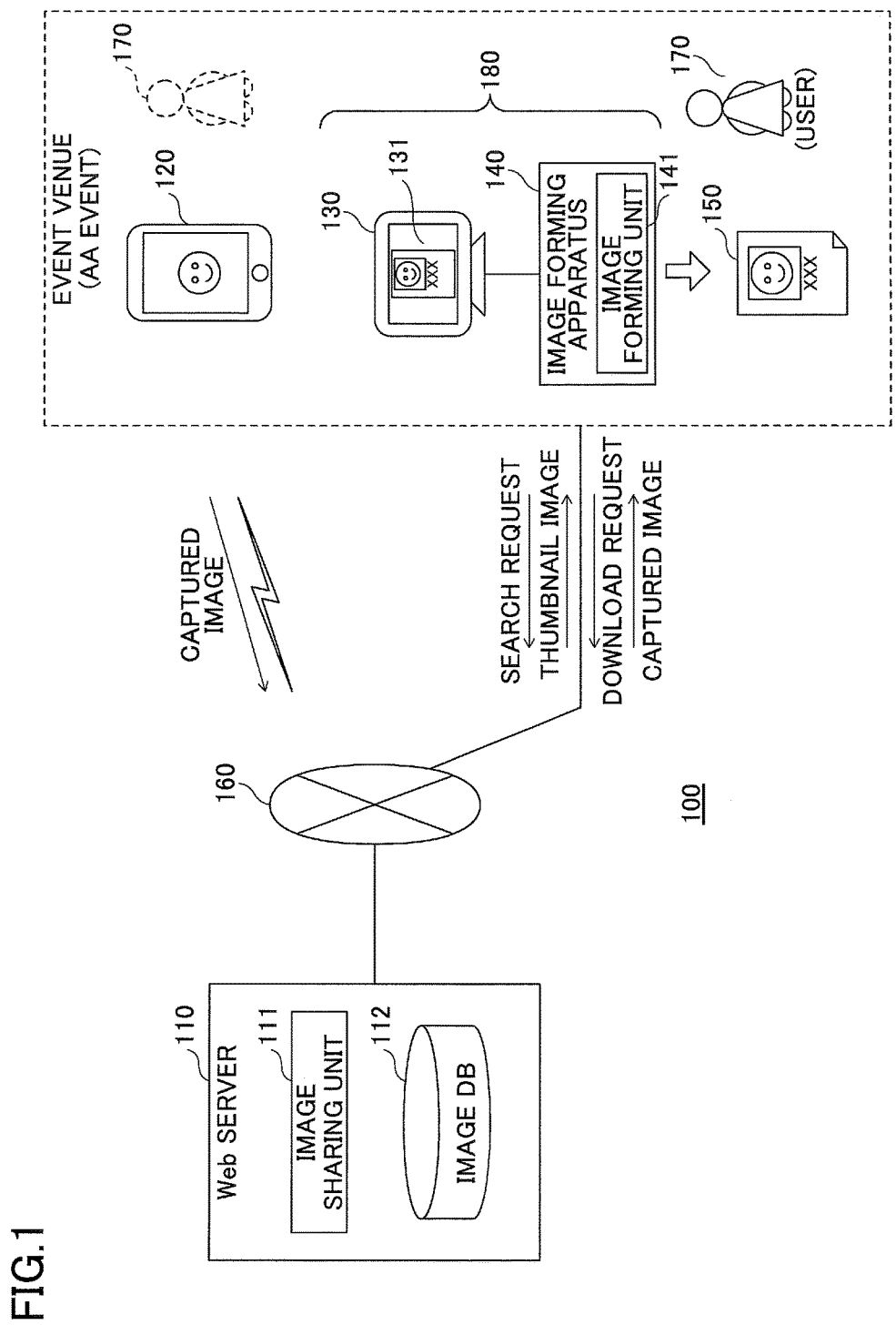
FIG. 1 is a first diagram illustrating an overall configuration of an image sharing system according to a first embodiment of the present invention.

In the related art, an image, which is obtained by printing out content (including a captured image), does not completely match an image, which is obtained by displaying the content via a web browser. Specifically, there is a displacement between these images at the level of pixels, and therefore the user will sense strangeness. Here, a displacement at the level of pixels means that the image, which is obtained by printing out the content, and the image, which is obtained by displaying the content, include figures having different sizes, characters having different fonts, and lines drawn at different positions. These differences occur because different renderers are generally used in the rendering process performed when displaying the content and in the rendering process performed when printing out the content.

A problem to be solved by an embodiment of the present invention is to reduce the displacement between an image obtained by displaying content by a web browser and an image obtained by printing out the content.

Embodiments of the present invention will be described by referring to the accompanying drawings. In the specification and drawings of the embodiments, the elements having substantially the same functions are denoted by the same reference numerals, and overlapping descriptions are omitted.

First Embodiment

<1. Configuration of Image Sharing System (First Embodiment)>

First, a description is given of the overall configuration of an image sharing system for providing an image sharing service. The image sharing system is a system including a printing process system according to a first embodiment. This image sharing system is capable of uploading a captured image and printing out content in which the uploaded captured image is inserted.

FIG. 1 is a first diagram illustrating an overall configuration of the image sharing system. Specifically, FIG. 1 illustrates how an image sharing system 100 is applied to a scene in which a user uses an image sharing service at a location where many users gather together such as an event venue.

As illustrated in FIG. 1, the image sharing system 100 includes a web server 110, a mobile terminal 120, and a printing process system 180. The web server 110 and the mobile terminal 120 are communicatively coupled to each other via a network 160. Similarly, the web server 110 and the printing process system 180 are communicatively coupled to each other via the network 160.

The web server 110 is a server device having a function for realizing image sharing. The web server 110 has an image sharing program installed. As this image sharing program is executed, the web server 110 functions as an image sharing unit 111.

The image sharing unit 111 receives a captured image from the mobile terminal 120 owned by a registered user 170, and stores the captured image in an image database (hereinafter abbreviated as "DB") 112. The image sharing unit 111 manages the captured images stored in the image DB 112 such that the captured images can be shared among other registered users.

Furthermore, when the image sharing unit 111 receives a search request from the printing process system 180, the image sharing unit 111 searches the image DB 112 for a captured image satisfying the conditions included in the search request, and sends a thumbnail image of a captured image, which has been found as a result of the search, to the printing process system 180.

Furthermore, when the image sharing unit 111 receives a download request from the printing process system 180, the image sharing unit 111 extracts the captured image, for which the download request has been made, from the image DB 112, and sends the extracted captured image to the printing process system 180.

The mobile terminal 120 is a terminal held by the user 170 who is to receive the image sharing service. The mobile terminal 120 has an exclusive-use application installed, for receiving the image sharing service. Furthermore, the mobile terminal 120 has an imaging function and a communication function.

The user 170 uses the application, which is installed in the mobile terminal 120, to upload a captured image captured by the mobile terminal 120, to the web server 110. In the example of FIG. 1, the user 170 holding the mobile terminal 120 has come to an event venue where an "AA event" is held, has captured an image at the event venue, and has uploaded the captured image to the web server 110.

Note that it is not essential for an exclusive-use application to be installed in the mobile terminal 120, in order for the user 170 to receive an image sharing service. The user 170 may access a web page provided by the web server 110 via a general-purpose web browser included in the mobile terminal 120 (for example, Firefox and google chrome, etc., (both registered trademarks), to upload the captured image.

The printing process system 180 includes a display device 130 and an image forming apparatus 140. The printing process system 180 is installed at the event venue where the "AA event" is held.

The display device 130 displays a screen for receiving the image sharing service. The display device 130 accepts, from the user 170, a search instruction including conditions for searching for a predetermined captured image from the captured images stored in the web server 110. Note that the conditions for searching for a predetermined captured image may be set in advance in the image forming apparatus 140, instead of being accepted from the user 170. For example, a hash tag, etc., may be set in the image forming apparatus 140 in advance, in order to search for a captured image uploaded in association with the "AA event" (a captured image having a hash tag "#AA" of the AA event attached).

Furthermore, when the image forming apparatus 140 receives thumbnail images of captured images satisfying the conditions from the web server 110, the display device 130 displays a thumbnail image list screen generated by the image forming apparatus 140, on the display screen.

Furthermore, the display device 130 accepts, from the user 170, an instruction to display a preview image with respect to one of the thumbnail images included in the displayed thumbnail image list screen.

When the image forming apparatus 140 receives, from the web server 110, the captured image with respect to the thumbnail image for which the display instruction has been accepted, the image forming apparatus 140 generates content 131 in which the received captured inserted is inserted. Then, the display device 130 displays a preview image of the content 131 on the display screen. Furthermore, the display device 130 accepts, from the user 170, an instruction to print the content 131 for which the preview image is displayed.

The image forming apparatus 140 is an apparatus including a printing function, such as a printer and a multifunction peripheral (MFP), etc. The image forming apparatus 140 has an image forming program installed. As this program is executed, the image forming apparatus 140 functions as an image forming unit 141.

The image forming unit 141 sends a search request to search for a captured image to the web server 110, and receives a thumbnail image of the captured image in response to the search request from the web server 110. The image forming unit 141 generates a thumbnail image list screen including the received thumbnail image, and outputs the thumbnail image list screen to the display device 130.

Furthermore, the image forming unit 141 sends, to the web server 110, a request to download a captured image corresponding to the thumbnail image for which a display instruction has been given by the user 170 in the thumbnail image list screen. Furthermore, the image forming unit 141 receives a captured image in response to the download request, from the web server 110. Furthermore, the image forming unit 141 generates the content 131 in which the received captured image is inserted, and outputs the content 131 to the display device 130. Accordingly, on the display device 130, a preview image of the content 131 in which the captured image is inserted, is displayed.

Furthermore, the image forming unit 141 performs a printing process in response to the display device 130 accepting an instruction to print the content 131 for which the preview image is displayed, and prints out printed matter 150.

As described above, by the image sharing system 100, the user 170 is able to use the mobile terminal 120 to upload a captured image captured at an event venue. Furthermore, the user 170 is able to give an instruction to display a captured image among the captured images that have been uploaded, and display, on the display device 130, a preview image of the content 131 in which the instructed captured image is inserted, and print out the content 131 via the image forming apparatus 140. Accordingly, the user 170 is able to acquire the printed matter 150.

Note that, in the printing process system 180, the image forming unit 141 performs an image forming process such that the preview image of the content 131 displayed on the display device 130 and the image of the printed matter 150 that has been printed out by the image forming apparatus 140 match each other (details are described below).

<2. Transition of Display Screen of Printing Process System (First Embodiment)>

Next, a description is given of the transition of a display screen displayed on the display device 130 of the printing process system 180.

FIG. 2 illustrates the transition of a display screen of the printing process system 180. When the printing process system 180 is activated, a web browser unit included in the image forming unit 141 is activated, and a search screen 210 as illustrated in FIG. 2 is displayed on the display screen of the display device 130.

The search screen 210 includes a search condition input field 211 and a search button 212. In the search condition input field 211, a condition for searching for a predetermined captured image, from among the captured images uploaded in the web server 110, is input. The condition for searching for a predetermined captured image includes a hash tag attached to the captured image, the time and date when the captured image has been captured, and the location where the captured image has been captured, etc.

When the user 170 inputs a condition in the search condition input field 211 and taps the search button 212, a thumbnail image of a captured image satisfying the input condition is sent from the web server 110 to the image forming apparatus 140. The image forming apparatus 140 generates a thumbnail image list screen 220 when the thumbnail image is received. Accordingly, the thumbnail image list screen 220 is displayed on the display screen of the display device 130.

In a state where the thumbnail image list screen 220 is displayed, the user 170 selects one of the thumbnail images and taps a preview button 223 that is provided by the web browser unit.

Accordingly, the display screen of the display device 130 transitions to a preview screen 230. Note that a black frame 222 indicated in the thumbnail image list screen 220 indicates that a thumbnail image 221 has been selected.

In the preview screen 230, to which the display screen has transitioned as the preview button 223 has been tapped, a preview image of the content 131 is displayed. The content 131 is generated by downloading a captured image corresponding to the selected thumbnail image 221 from the web server 110, inserting the captured image in a predetermined template, and performing a rendering process. Note that in the present embodiment, it is assumed that a predetermined logo image ("XXX") is inserted in the template, in addition to inserting the captured image. Therefore, in the following description, a "captured image, etc." includes all of the resources that are downloaded from a storage destination and inserted in the template, including a captured image and a logo image.

When the user 170 taps a print button 232 provided by the web browser unit in a state where the preview image of the content 131 is displayed on the preview screen 230, the image forming unit 141 starts the printing process.

<3. Overview of Image Forming Process in Printing Process System (First Embodiment)>

Figure 3B:
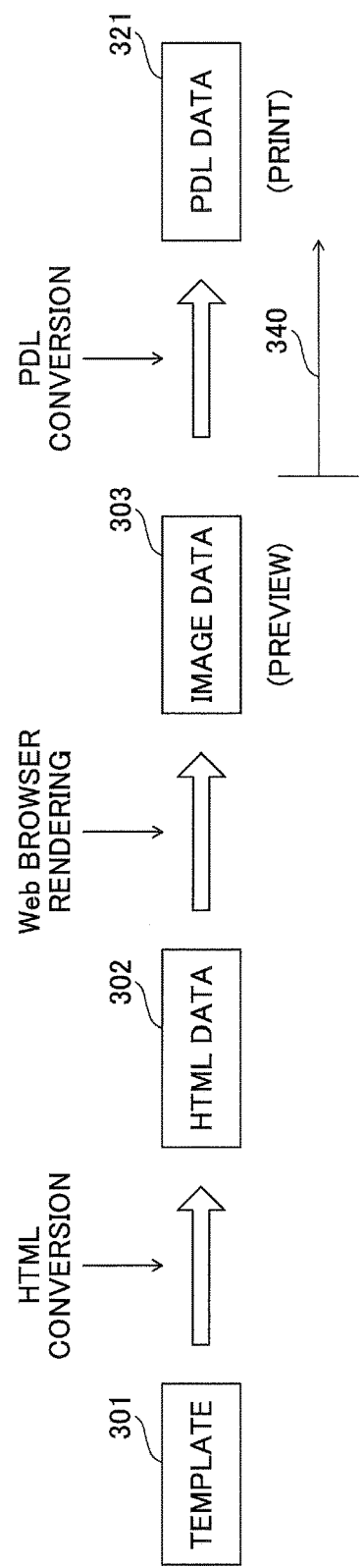
FIG. 3B is a first diagram illustrating an overview of an image forming process in the printing process system according to the first embodiment of the present invention.

Next, a description is given of the overview of the image forming process in the printing process system 180. FIG. 3B is a first diagram illustrating the overview of the image forming process in the printing process system 180. Note that as a matter of comparison, an image forming process in a printing process system of the related art is also illustrated in FIG. 3A.

FIG. 3A illustrates an overview of an image forming process in a printing process system of the related art. In FIG. 3A, a template 301 is a file in which a captured image, etc., is to be inserted, when displaying or printing out the captured image, etc., which has been downloaded from a web server, etc., via the web browser unit.

In the printing process system of the related art, when displaying a preview image, a Hyper Text Markup Language (HTML) conversion process is performed on the template 301 to generate HTML data 302 that is an example of content. The HTML data 302 is generated by describing, in the template 301, information (Uniform Resource Locator (URL)), which indicates the storage destination of the captured image, etc., to be inserted in the template 301.

Furthermore, in the printing process system of the related art, a rendering process for displaying an image (web browser rendering process) is performed on the HTML data 302 to generate image data 303 that can be displayed by the web browser unit. Specifically, in the printing process system of the related art, the HTML data 302 is interpreted to download a captured image, etc., from the storage destination described in the HTML data 302, and insert the captured image, etc., in the HTML data 302. Furthermore, in the printing process system of the related art, the HTML data 302 is interpreted to perform a web browser rendering process on the HTML data 302 in which the captured image, etc., is inserted, and generate the image data 303.

In the printing process system of the related art, the image data 303 generated as described above is used to display a preview image.

Furthermore, in the printing process system of the related art, when printing out an image, a HTML conversion process is performed on the template 301 to generate the HTML data 302, and a rendering process for printing an image is performed to generate image data 311. At this time, in the printing process system of the related art, the rendering process for printing an image is performed by using a renderer that is different from the renderer used when performing the web browser rendering process. A unique renderer is provided in the application operating when printing out an image at the image forming apparatus, and this unique renderer is typically used when printing out images.

Note that a rendering process means a process of interpreting data for identifying the content of an image or a screen, and converting this data into an actual image (an assembly of pixels such as a bitmap format, etc.) to be displayed on a screen, etc. In the present embodiment, a rendering process means a process of interpreting the HTML data 302 and converting the HTML data 302 into an assembly of pixels.

In the printing process system of the related art, a Page Description Language (PDL) conversion process is performed on the generated image data 311 to generate PDL data 312, and PDL data 321 is printed out.

As described above, in the printing process system of the related art, different renderers are used in the rendering process for display when displaying a preview image and the rendering process for printing when printing out the image. Therefore, it has been difficult to generate the image data 311 and the image data 303 so as to be completely matching each other. As a result, a displacement has occurred at the level of pixels, between the preview image displayed by using the image data 303 and the image of the printed matter obtained by performing a PDL conversion process on the image data 311 and printing out the image.

On the other hand, FIG. 3B illustrates an overview of an image forming process in the printing process system 180 according to the present embodiment. In the printing process system 180, in order to display a preview image, a HTML conversion process is performed on the template 301 to generate the HTML data 302.

Furthermore, in the printing process system 180, a rendering process for displaying an image (web browser rendering process) is performed on the HTML data 302 to generate the image data 303 that can be displayed by the web browser unit. Specifically, in the printing process system 180, the HTML data 302 is interpreted to download the captured image, etc., from the storage destination described in the HTML data 302, and the captured image, etc., is inserted in the HTML data 302. Furthermore, in the printing process system 180, the HTML data 302 is interpreted to perform a web browser rendering process on the HTML data 302 in which the captured image, etc., is inserted, and the image data 303 is generated.

In the printing process system 180, the image data 303 generated as described above is used to display a preview image.

Here, the printing process system 180 saves the image data 303 that has been used for displaying a preview image, and performs a PDL conversion process on the image data 303 when printing out an image, to generate the PDL data 321.

As described above, in the printing process system 180, the rendering process for display when displaying a preview image and the rendering process for printing when printing out an image are not separate processes. Therefore, the image data used for displaying a preview image and the image data used for printing out an image completely match each other. Thus, according to the printing process system 180, it is possible to reduce displacements at the level of pixels between the image displayed as a preview image by using the image data 303, and the image of the printed matter obtained by performing a PDL conversion process on the image data 303 and printing out the image.

In addition, in the case of the printing process system 180, it is possible to reduce the time taken from when the print button 232 is tapped at the preview screen 230 to when the printed matter 150 is actually printed out. In the printing process system of the related art, after the print button is tapped, a HTML conversion process, a rendering process for printing, and a PDL conversion process are executed (see an arrow 330 in FIG. 3A). On the other hand, in the printing process system 180, the PDL conversion process is performed with the use of the image data 303. That is, there is no need to perform a HTML conversion process or a rendering process for printing. After the print button 232 is tapped, only the PDL conversion process is performed (see an arrow 340 in FIG. 3B).

As described above, in the printing process system 180, it is possible to reduce the processes performed from when the print button 232 is tapped in the preview screen 230 to when the printed matter 150 is printed out. Therefore, it is possible to reduce the time taken until the printed matter 150 is printed out.

<4. Template and HTML Data (First Embodiment)>

Next, a description is given of details of the template 301 and the HTML data 302. FIGS. 4A and 4B respectively illustrate examples of a template and HTML data.

FIG. 4A illustrates an example of the template 301. As illustrated in FIG. 4A, the template 301 is described in a markup language.

FIG. 4B illustrates an example of the HTML data 302 that has undergone the HTML conversion process. As illustrated in FIG. 4B, in the HTML data 302, a URL indicating the storage destination of the captured image to be inserted, is described (see a description 401). Furthermore, in the HTML data 302, a URL indicating the storage destination of the logo image to be inserted, is described (see description 402). In the present embodiment, the storage destination of the captured image identified by the description 401, is inside the web server 110. On the other hand, the storage destination of the logo image identified by the description 402, may be any storage destination. However, in the following description, it is assumed that the storage destination of the logo image is in another web server coupled to the network 160. Note that it is needless to say that the storage destination of the logo image is not limited to another web server; for example, the storage destination of the logo image may be inside the image forming apparatus 140.

<5. Example of Image Data (First Embodiment)>

Figure 5:
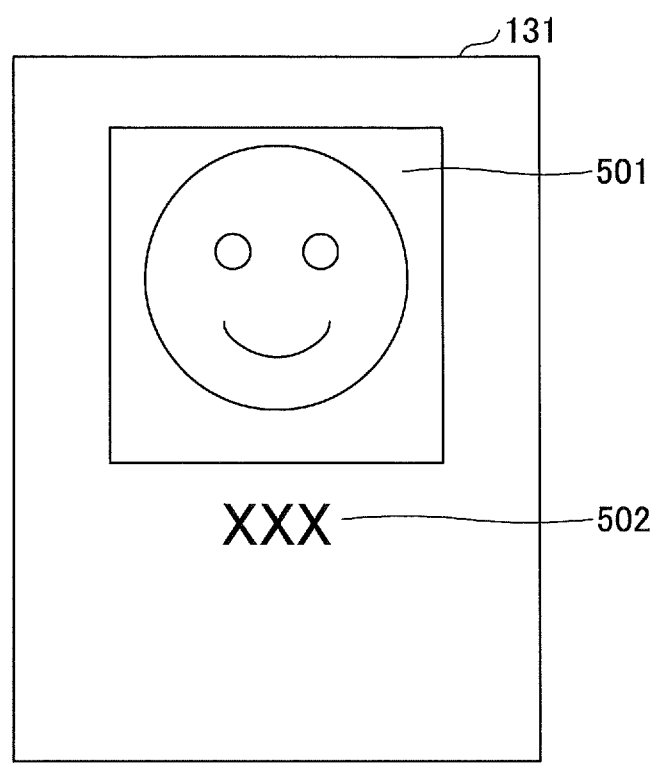
FIG. 5 illustrates an example of image data according to the first embodiment of the present invention.

Next, a description is given of the image data 303, which is generated as a web browser rendering process is performed on the HTML data 302, and which is used when the web browser unit performs a display process. FIG. 5 illustrates an example of the image data. Specifically, FIG. 5 illustrates a case where a display process has been performed by the web browser unit and a preview image of the content 131 is displayed.

As illustrated in FIG. 5, the image data includes an area 501 in which a captured image downloaded from a storage destination is inserted, and an area 502 in which a logo image ("XXX") downloaded from a storage destination is inserted. The logo image is, for example, an image of the logo of the company providing the printing process system 180.

<6. Hardware Configuration of Image Forming Apparatus (First Embodiment)>

Figure 6:
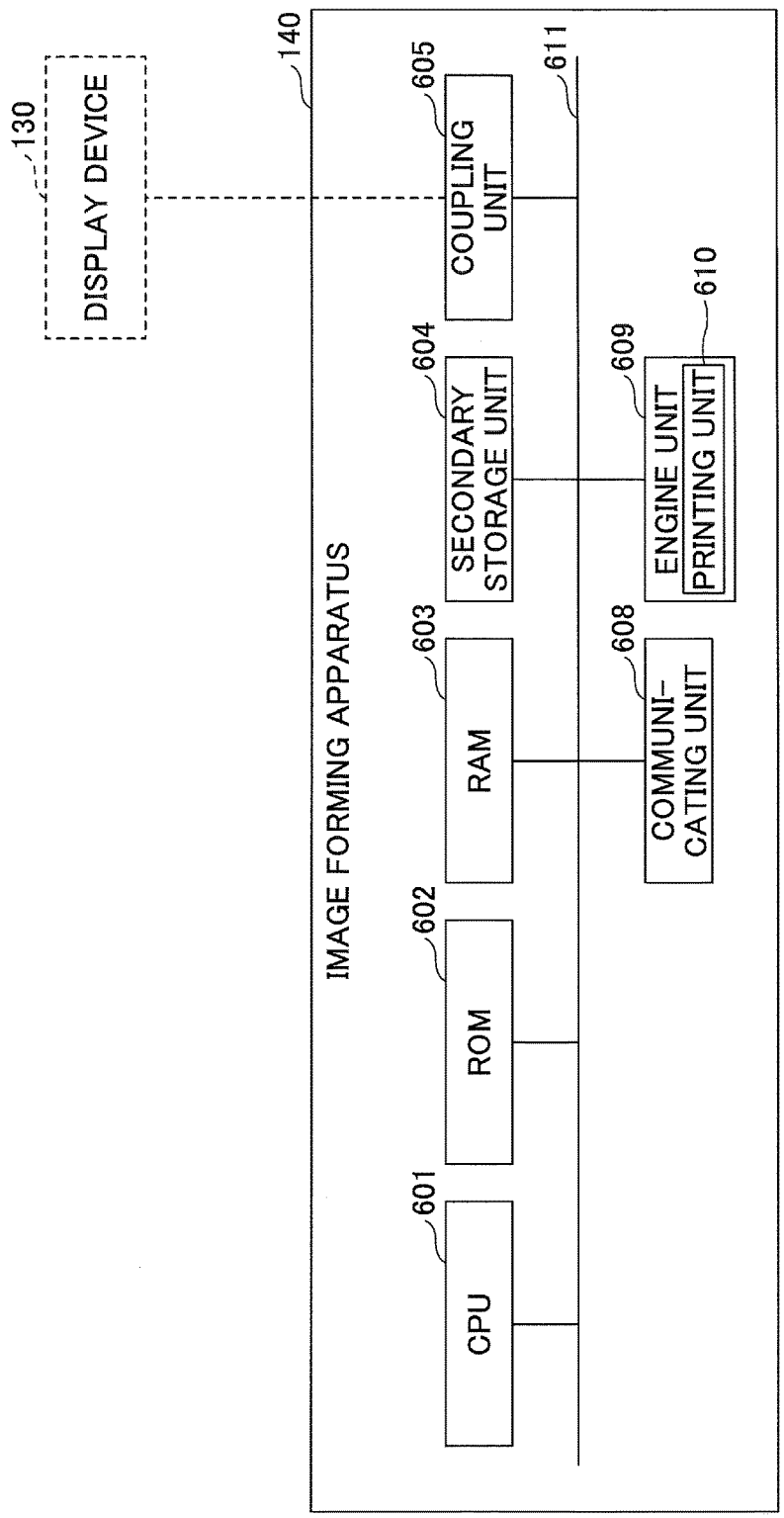
FIG. 6 is an example of a hardware block diagram of an image forming apparatus according to the first embodiment of the present invention.

Next, a description is given of a hardware configuration of the image forming apparatus 140. FIG. 6 is an example of a hardware block diagram of the image forming apparatus 140.

As illustrated in FIG. 6, the image forming apparatus 140 includes a Central Processing Unit (CPU) 601, a Read-Only Memory (ROM) 602, a Random Access Memory (RAM) 603, and a secondary storage unit 604. Furthermore, the image forming apparatus 140 includes a coupling unit 605, a communicating unit 608, and an engine unit 609. Note that the units of the image forming apparatus 140 are coupled to each other by a bus 611.

The CPU 601 is a computer for executing various programs (for example, an image forming program) stored in the secondary storage unit 604.

The ROM 602 is non-volatile memory. The ROM 602 stores various programs and data, etc., required by the CPU 601 for executing various programs stored in the secondary storage unit 604. Specifically, the ROM 602 stores a boot program such as the Basic Input/Output System (BIOS) and the Extensible Firmware Interface (EFI), etc.

The RAM 603 is a main memory such as a Dynamic Random Access Memory (DRAM) and a Static Random Access Memory (SRAM), etc. The RAM 603 functions as a work area that is expanded when the CPU 601 executes various programs stored in the secondary storage unit 604. Note that a retaining unit described below is realized by the RAM 603.

The secondary storage unit 604 stores various programs executed by the CPU 601 and data (for example, the template 301, etc.) that is used when various programs are executed by the CPU 601.

The coupling unit 605 is a device for coupling the image forming apparatus 140 and an external device to each other. In the present embodiment, the coupling unit 605 couples the image forming apparatus 140 and the display device 130 to each other. Note that the image forming apparatus 140 and the display device 130 may be coupled to each other in a wired manner or in a wireless manner.

The search screen 210, the thumbnail image list screen 220, and the preview screen 230 described above are sent to the display device 130 via the coupling unit 605. Furthermore, various instructions (a search instruction, a display instruction, and a print instruction), which are sent as the search button 212, the preview button 223, and the print button 232 are tapped, are input to the image forming apparatus 140 via the coupling unit 605.

The communicating unit 608 is a device for communicating with the web server 110, etc., via the network 160.

The engine unit 609 includes a printing unit 610, and functions as a printing engine. The printed matter 150 is printed out by the engine unit 609.

<7. Functional Configuration of Image Forming Apparatus (First Embodiment)>

Figure 7:
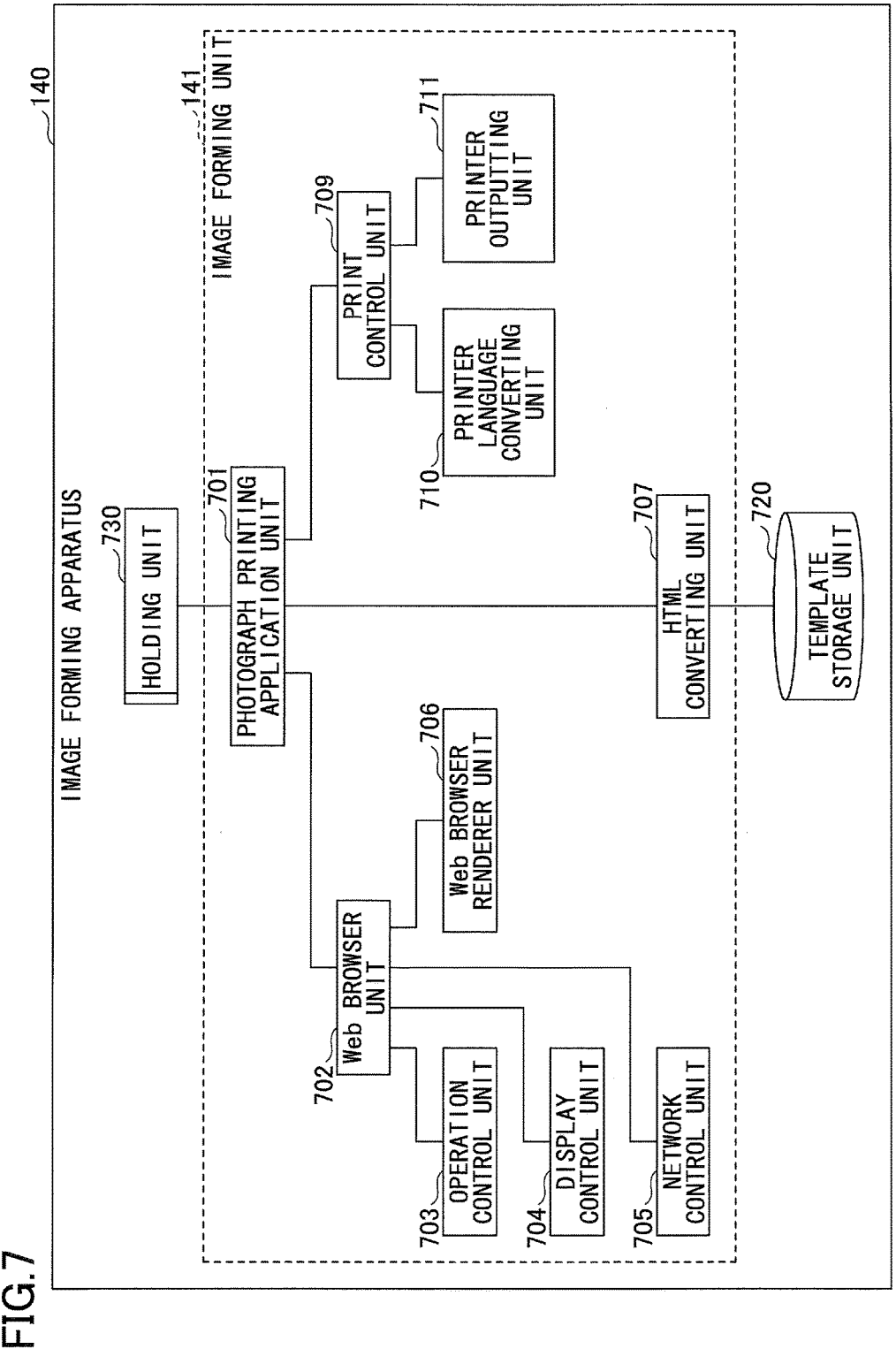
FIG. 7 is an example of a functional block diagram of the image forming apparatus according to the first embodiment of the present invention.

Next, a description is given of a functional configuration of the image forming unit 141 realized in the image forming apparatus 140. FIG. 7 is an example of a functional block diagram of the image forming apparatus 140.

As illustrated in FIG. 7, the image forming unit 141 realized in the image forming apparatus 140 includes a photograph printing application unit 701, a web browser unit 702, an operation control unit 703, a display control unit 704, a network control unit 705, and a web browser renderer unit 706.

Furthermore, the image forming unit 141 includes an HTML converting unit 707, a print control unit 709, a printer language converting unit 710, and a printer outputting unit 711.

The photograph printing application unit 701 controls the overall functions of the image forming apparatus 140 added to the image sharing service (mainly displaying a preview image of the content 131 and printing out the content 131).

Specifically, the photograph printing application unit 701 is realized as a web application. The photograph printing application unit 701 arranges a shortcut icon, which is associated with the URL for displaying the search screen 210, on the top screen of the image forming apparatus 140. When the user 170, who is operating the image forming apparatus 140, taps the shortcut icon arranged on the top screen, the photograph printing application unit 701 is called based on the URL.

The photograph printing application unit 701, which has been called in response to the user 170 tapping the shortcut icon, generates the search screen 210. Note that as the photograph printing application unit 701 generates the search screen 210, the web browser unit 702 displays the search screen 210 via the display control unit 704.

Furthermore, the photograph printing application unit 701 generates the thumbnail image list screen 220 based on a thumbnail image sent from the web server 110. Furthermore, when an instruction to display a preview image is input in a state where the thumbnail image list screen 220 is displayed, the photograph printing application unit 701 receives the display request from the web browser unit 702 and extracts the URL of the captured image that is the target of the preview display. Note that it is assumed that the URL of the captured image is attached to the thumbnail image sent from the web server 110. The photograph printing application unit 701, which has extracted the URL, reports a HTML data generation request including the extracted URL to the HTML converting unit 707, receives the HTML data 302 generated at the HTML converting unit 707, and reports the HTML data 302 to the web browser unit 702.

Furthermore, when the image data 303 is received from the web browser unit 702 in response to reporting the HTML data 302, the photograph printing application unit 701 saves the received image data 303 in a retaining unit 730 that is an example of a retainer.

Furthermore, the photograph printing application unit 701 also functions as a receiver and an acquirer. When a print request is received from the web browser unit 702, the photograph printing application unit 701 reads the image data 303 retained in the retaining unit 730 to acquire the image data 303 from the retaining unit 730. The photograph printing application unit 701, which has acquired the image data 303, reports a print request including the acquired image data 303 to the print control unit 709.

The web browser unit 702 accesses the web server 110 via the network control unit 705.

Furthermore, the web browser unit 702 displays the search screen 210 generated by the photograph printing application unit 701 on the display device 130, via the display control unit 704. When the user 170 inputs a condition and a search instruction in response to displaying the search screen 210, the web browser unit 702 accepts the condition and the search instruction via the operation control unit 703, and sends a search request to the web server 110 via the network control unit 705.

Furthermore, the web browser unit 702 receives the thumbnail image sent from the web server 110 via the network control unit 705, and reports the thumbnail image to the photograph printing application unit 701. When the thumbnail image list screen 220 is generated by the photograph printing application unit 701 in response to the thumbnail image being reported, the web browser unit 702 displays the thumbnail image list screen 220 on the display device 130 via the display control unit 704. When the user 170 inputs an instruction to display a preview image in a state where the thumbnail image list screen 220 is displayed, the web browser unit 702 accepts the display instruction via the operation control unit 703. The web browser unit 702, which has accepted the display instruction, reports a display request with respect to the captured image of the thumbnail image that has been selected when the display instruction has been accepted, to the photograph printing application unit 701.

Furthermore, in response to the display request being reported, the web browser unit 702 interprets the HTML data 302 received from the photograph printing application unit 701, and sends a request to download the captured image, etc., to the web server 110, etc. At this time, the web browser unit 702 functions as a reader, and reads the captured image, etc., that has been downloaded from the storage destination in response to the download request, and inserts the captured image, etc., in the HTML data 302. Furthermore, the web browser unit 702 reports a rendering request including the HTML data 302 in which the captured image, etc., has been inserted, to the web browser renderer unit 706.

Furthermore, the web browser unit 702 reports the image data 303, which is received from the web browser renderer unit 706 in response to the rendering request, to the photograph printing application unit 701, and also outputs the image data 303 to the display device 130 via the display control unit 704. Accordingly, the preview screen 230 including a preview image of the content 131, is displayed on the display device 130. When the user 170 inputs a print instruction in response to the preview screen 230 being displayed, the web browser unit 702 accepts the print instruction via the operation control unit 703. The web browser unit 702 that has accepted the print instruction reports a print request to the photograph printing application unit 701.

The operation control unit 703 reports, to the web browser unit 702, the instructions (the search instruction, the display instruction, and the print instruction), etc., input by the user 170 in a state where the search screen 210, the thumbnail image list screen 220, and the preview screen 230 are displayed on the display device 130.

The display control unit 704 displays, on the display device 130, the respective screens (the search screen 210, the thumbnail image list screen 220, and the preview screen 230), under the control by the web browser unit 702.

The network control unit 705 sends the requests (the search request and the download request) reported from the web browser unit 702, to the web server 110. Furthermore, the network control unit 705 receives the thumbnail image sent from the web server 110 in response to the search request, and reports the thumbnail image to the web browser unit 702. Furthermore, the network control unit 705 receives the captured image, etc., sent from the web server 110, etc., in response to the download request, and reports the captured image, etc., to the web browser unit 702.

The web browser renderer unit 706 is a renderer that is an example of a first generator. When a rendering request with respect to the HTML data 302, in which the captured image, etc., is inserted, is received from the web browser unit 702, the web browser renderer unit 706 performs a web browser rendering process with respect to the HTML data 302. Accordingly, the web browser renderer unit 706 generates the image data 303. Furthermore, the web browser renderer unit 706 reports the generated image data 303 to the web browser unit 702.

The HTML converting unit 707 is an example of a converter. When a HTML data generation request is received from the photograph printing application unit 701, the HTML converting unit 707 reads the template 301 stored in a template storage unit 720. Furthermore, the HTML converting unit 707 describes a URL, which is included in the HTML data generation request, in the template 301 that has been read, to generate the HTML data 302. Furthermore, the HTML converting unit 707 reports the generated HTML data 302 to the photograph printing application unit 701.

The print control unit 709, the printer language converting unit 710, and the printer outputting unit 711 are examples of an outputter.

Among these, when the print control unit 709 receives a print request from the photograph printing application unit 701, the print control unit 709 reports the image data 303 included in the print request to the printer language converting unit 710, and makes a PDL conversion request. Furthermore, when the print control unit 709 receives the PDL data 321 from the printer language converting unit 710 in response to a PDL conversion request, the print control unit 709 reports the print request including the received PDL data 321 to the printer outputting unit 711.

When the printer language converting unit 710 receives the PDL conversion request including the image data 303 from the print control unit 709, the printer language converting unit 710 converts the image data 303, which is included in the received PDL conversion request, into the PDL data 321, and reports the PDL data 321 to the print control unit 709.

When the printer outputting unit 711 receives the print request including the PDL data 321 from the print control unit 709, the printer outputting unit 711 sends the PDL data 321 to the printing unit 610 of the engine unit 609.

<8. Flow of Image Forming Process in Printing Process System (First Embodiment)>

Figure 8:
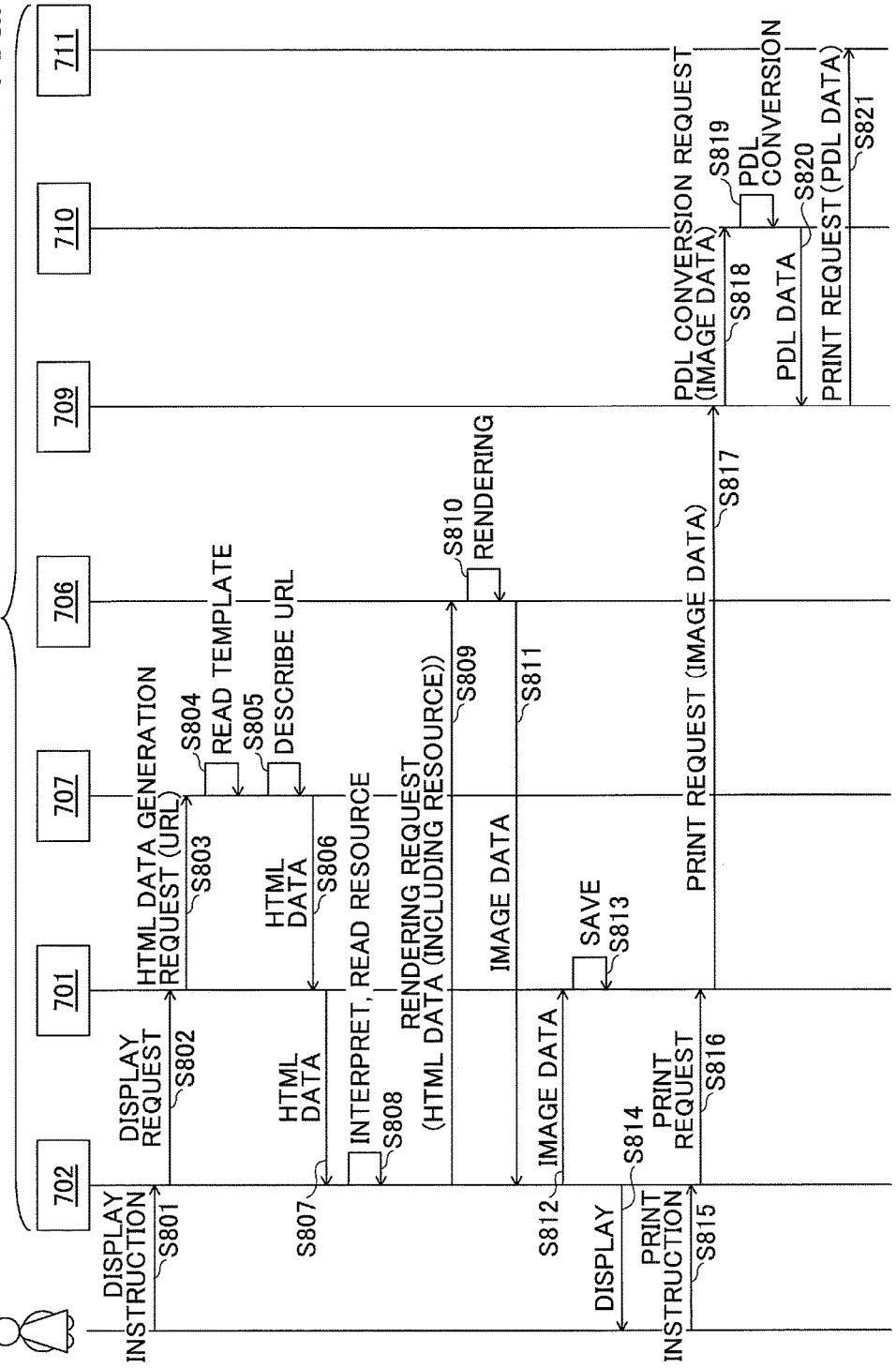
FIG. 8 is a first sequence diagram illustrating the flow of an image forming process in the printing process system according to the first embodiment of the present invention.

Next, a description is given of the flow of an image forming process (process after the thumbnail image list screen 220 is displayed) in the printing process system 180. FIG. 8 is a first sequence diagram illustrating the flow of an image forming process in the printing process system 180. In a state where the thumbnail image list screen 220 is displayed on the display device 130, the image forming process illustrated in FIG. 8 is started.

In step S801, when the user 170 selects the thumbnail image 221 included in the thumbnail image list screen 220 and taps the preview button 223 to input a display instruction, the web browser unit 702 accepts the display instruction.

In step S802, the web browser unit 702, which has accepted the display instruction, reports a display request to the photograph printing application unit 701.

When the photograph printing application unit 701 receives the display request, in step S803, the photograph printing application unit 701 reports a HTML data generation request to the HTML converting unit 707. The HTML data generation request includes the URL of the captured image and the URL of the logo image with respect to the selected thumbnail image 221. Note that, as described above, it is assumed that the URL of the captured image with respect to the thumbnail image is attached to the thumbnail image sent from the web server 110 when displaying the thumbnail image list screen 220. On the other hand, it is assumed that the URL of the logo image is set in advance as a default URL in the photograph printing application unit 701.

In step S804, the HTML converting unit 707, which has received the HTML data generation request, reads the template 301 from the template storage unit 720. Furthermore, in step S805, the HTML converting unit 707 describes the URLs at the positions where the captured image and the logo images are to be inserted, in the template 301 that has been read, and generates the HTML data 302.

In step S806, the HTML converting unit 707 reports the generated HTML data 302 to the photograph printing application unit 701. Furthermore, in step S807, the photograph printing application unit 701 reports the HTML data 302 to the web browser unit 702.

In step S808, the web browser unit 702 interprets the received HTML data 302. Furthermore, the web browser unit 702 makes a download request based on the URL described in the HTML data 302, to receive the captured image, etc. The web browser unit 702 inserts the received captured image, etc., in the HTML data 302.

In step S809, the web browser unit 702 reports a rendering request including the HTML data 302 in which the captured image, etc., has been inserted, to the web browser renderer unit 706.

In step S810, the web browser renderer unit 706 performs a web browser rendering process on the HTML data 302 included in the rendering request, and generates the image data 303.

In step S811, the web browser renderer unit 706 reports the generated image data 303 to the web browser unit 702. Furthermore, in step S812, the web browser unit 702 reports the received image data 303 to the photograph printing application unit 701.

In step S813, the photograph printing application unit 701 saves the received image data 303 in the retaining unit 730.

On the other hand, in step S814, the web browser unit 702 outputs the received image data 303 to the display device 130, via the display control unit 704. Accordingly, a preview image of the content 131 is displayed on the preview screen 230. When the preview image of the content 131 is displayed on the preview screen 230, and the user 170 taps the print button 232 to input a print instruction, in step S815, the web browser unit 702 accepts the print instruction.

In step S816, the web browser unit 702, which has accepted the print instruction, reports a print request to the photograph printing application unit 701.

In step S817, the photograph printing application unit 701, which has received the print request, reads and acquires the image data 303 from the retaining unit 730, and reports a print request including the acquired image data 303, to the print control unit 709.

In step S818, the print control unit 709, which has received the print request including the image data 303, reports a PDL conversion request including the image data 303 to the printer language converting unit 710.

In step S819, the printer language converting unit 710, which has received the PDL conversion request, performs a PDL conversion process on the image data 303 included in the PDL conversion request, and generates the PDL data 321. Furthermore, in step S820, the printer language converting unit 710 reports the generated PDL data 321 to the print control unit 709.

In step S821, the print control unit 709, which has received the PDL data 321, reports the print request including the received PDL data 321, to the printer outputting unit 711.

Note that the printer outputting unit 711, which has received the print request, outputs the PDL data 321 to the printing unit 610 of the engine unit 609. Accordingly, the printed matter 150 is printed out.

Note that in the above image forming process, in step S813, the image data 303, which has been processed at the web browser renderer unit 706, is saved in the retaining unit 730 by the photograph printing application unit 701, and a print instruction from the user 170 is waited. However, without waiting for a print instruction from the user 170, steps S817 through S820 may be performed at the same time as the image data 303 is output to the display device 130 in step S814. In this case, the photograph printing application unit 701 saves the PDL data 321 in the retaining unit 730 instead of the image data 303, until a print instruction is accepted from the user 170.

<9. Overview (First Embodiment)>

As is clear from the above description, the printing process system 180 according to the present embodiment has the following features.

- When the web browser unit 702 displays a preview image of the HTML data (content) in which the captured image, etc., is inserted, the web browser renderer unit 706 performs a rendering process on the HTML data to generate image data. Furthermore, the photograph printing application unit 701 saves the generated image data in the retaining unit 730.
- When a print request is received with respect to the HTML data (content), for which a preview image has been displayed on the display screen by the web browser unit 702 with the use of the generated image data, the photograph printing application unit 701 acquires the image data from the retaining unit 730.
- The printer language converting unit 710 performs a PDL conversion process on the acquired image data to generate PDL data, and the printer outputting unit 711 outputs the generated PDL data to the printing unit 610.

Accordingly, by the printing process system 180 according to the present embodiment, the image data used for displaying a preview image and the image data used for printing out an image can be matched with each other. As a result, it is possible to reduce displacements between the image obtained by displaying a preview image of the content by the web browser unit 702, and the image of the printed matter obtained by printing out the content.

Second Embodiment

The first embodiment described above has a configuration in which the image data used for printing out an image is generated by the web browser renderer unit 706. However, by this configuration, the image data, which is generated at the web browser renderer unit 706, needs to be acquired by the print control unit 709 via the web browser unit 702. That is, a new interface needs to be added to the web browser unit 702.

Accordingly, in a second embodiment, a renderer for generating the image data to be used for printing out an image is provided, separately from the renderer for generating the image data to be used for displaying a preview image. Thus, the web browser unit 702 does not need to be involved for the print control unit 709 to acquire the image data. However, the renderer for generating the image data to be used for printing out an image is the same type of renderer as the renderer for generating the image data to be used for displaying a preview image. Accordingly, the image data to be used for displaying a preview image and the image data to be used for printing out an image can be matched with each other. Note that renderers of the same type described here mean that the renderers perform rendering processes of processing contents (rendering methods) that match each other. Accordingly, the same effects as those of the first embodiment can be achieved without adding a new interface to the web browser unit 702.

In the following, the differences between the second embodiment and the first embodiment are mainly described. Note that in the first embodiment described above, in the printing process system 180 including the display device 130 and the image forming apparatus 140, the functional units of the image forming unit 141 are realized at the image forming apparatus 140. However, in the second embodiment, a tablet terminal is provided instead of the display device 130, to form a print processing system including a tablet terminal and the image forming apparatus 140, and the functional units in the image forming unit 141 are realized at the tablet terminal.

<1. Overview of Image Forming Process in Printing Process System (Second Embodiment)>

Figure 9:
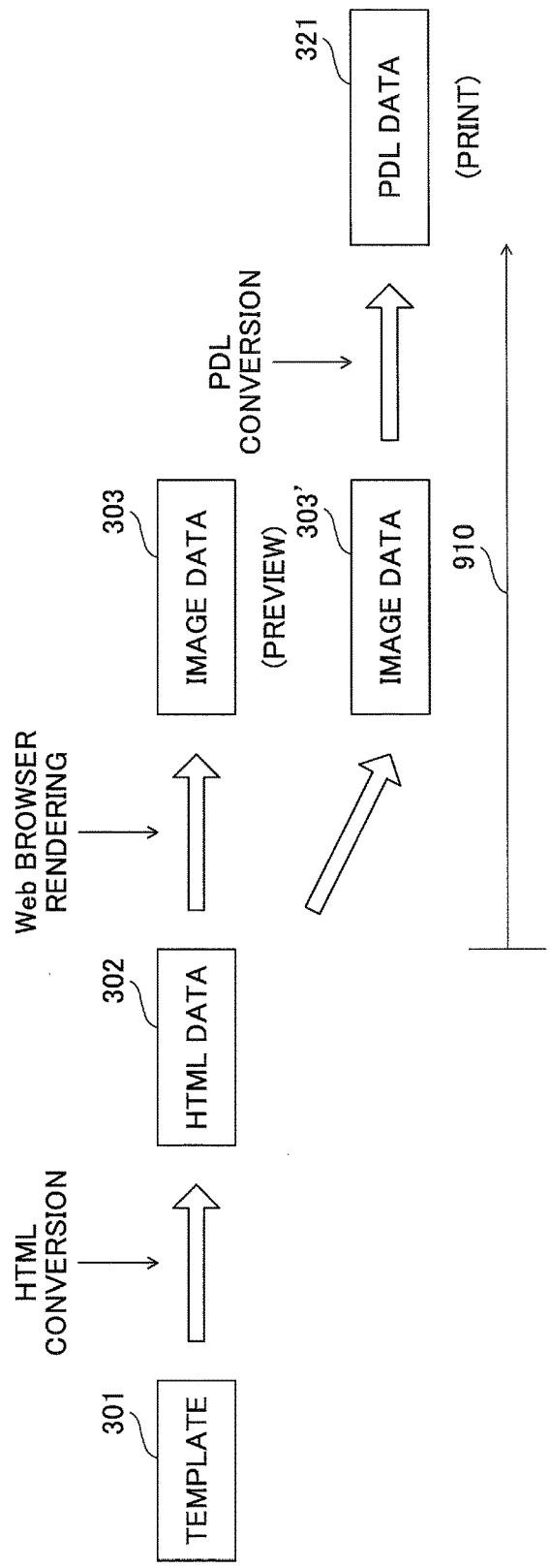
FIG. 9 is a second diagram illustrating the overview of the image forming process in the printing process system according to a second embodiment of the present invention.

First, a description is given of an overview of the image forming process in the printing process system 180 according to the second embodiment. FIG. 9 is a second diagram illustrating the overview of the image forming process in the printing process system 180.

When the tablet terminal (an example of a display device) included in the printing process system 180 in the present embodiment displays a preview image, as illustrated in FIG. 9, the tablet terminal performs a HTML conversion process on the template 301 to generate the HTML data 302.

Furthermore, the tablet terminal included in the printing process system 180 performs a web browser rendering process on the generated HTML data 302, to generate the image data 303 that can be displayed by the web browser unit 702. Specifically, the tablet terminal included in the printing process system 180 interprets the HTML data 302 to download the captured image, etc., from the storage destination described in the HTML data 302, and inserts the received captured image, etc., in the HTML data 302. Furthermore, the tablet terminal included in the printing process system 180 interprets the HTML data 302 to perform a web browser rendering process on the HTML data 302 in which the captured image, etc., is inserted, to generate the image data 303.

The tablet terminal included in the printing process system 180 displays a preview image by using the image data 303 generated as described above.

In response to the tablet terminal displaying a preview image, the user 170 inputs a print instruction. Accordingly, the tablet terminal performs a web browser rendering process on the HTML data 302. At this time, at the tablet terminal, the same type of renderer as the renderer used for generating the image data 303 is used for performing the web browser rendering process, and image data 303' is generated.

Here, the image data 303 and the image data 303' are image data items that are generated by using renderers of the same type, based on the same HTML data 302. Therefore, the image data 303 and the image data 303' are the same image data. At the tablet terminal, a PDL conversion process is performed on the image data 303', which is the same image data as the image data 303, to generate the PDL data 321.

As described above, in the printing process system 180 according to the second embodiment, renderers of the same type are used to generate the image data items based on the same HTML data, and therefore the image data used for displaying a preview image and the image data used for printing out an image can be completely matched with each other. As a result, it is possible to reduce displacements at the level of pixels between a preview image displayed by using the image data 303, and an image of the printed matter obtained by performing a PDL conversion process on the image data 303' and printing out the image.

Note that also in the printing process system 180 according to the second embodiment, it is possible to reduce the time taken from when the print button 232 is tapped at the preview screen 230 to when the printed matter 150 is actually printed out. As described in the first embodiment, in the printing process system of the related art, after the print button is tapped, a HTML process, a rendering process for printing, and a PDL conversion process are executed (see the arrow 330 in FIG. 3A). On the other hand, in the printing process system 180 according to the second embodiment, image data is generated by using the HTML data 302 and a PDL conversion process is performed on the image data. That is, there is no need to perform a HTML conversion process. After the print button 232 is tapped, only the web browser rendering process and the PDL conversion process need to be performed (see an arrow 910 in FIG. 9).

As described above, in the printing process system 180 according to the second embodiment, it is possible to reduce the processes performed from when the print button 232 is tapped to when the printed matter 150 is printed out. Therefore, it is possible to reduce the time taken until the printed matter 150 is printed out.

<2. Hardware Configuration of Printing Process System (Second Embodiment)>

Figure 10:
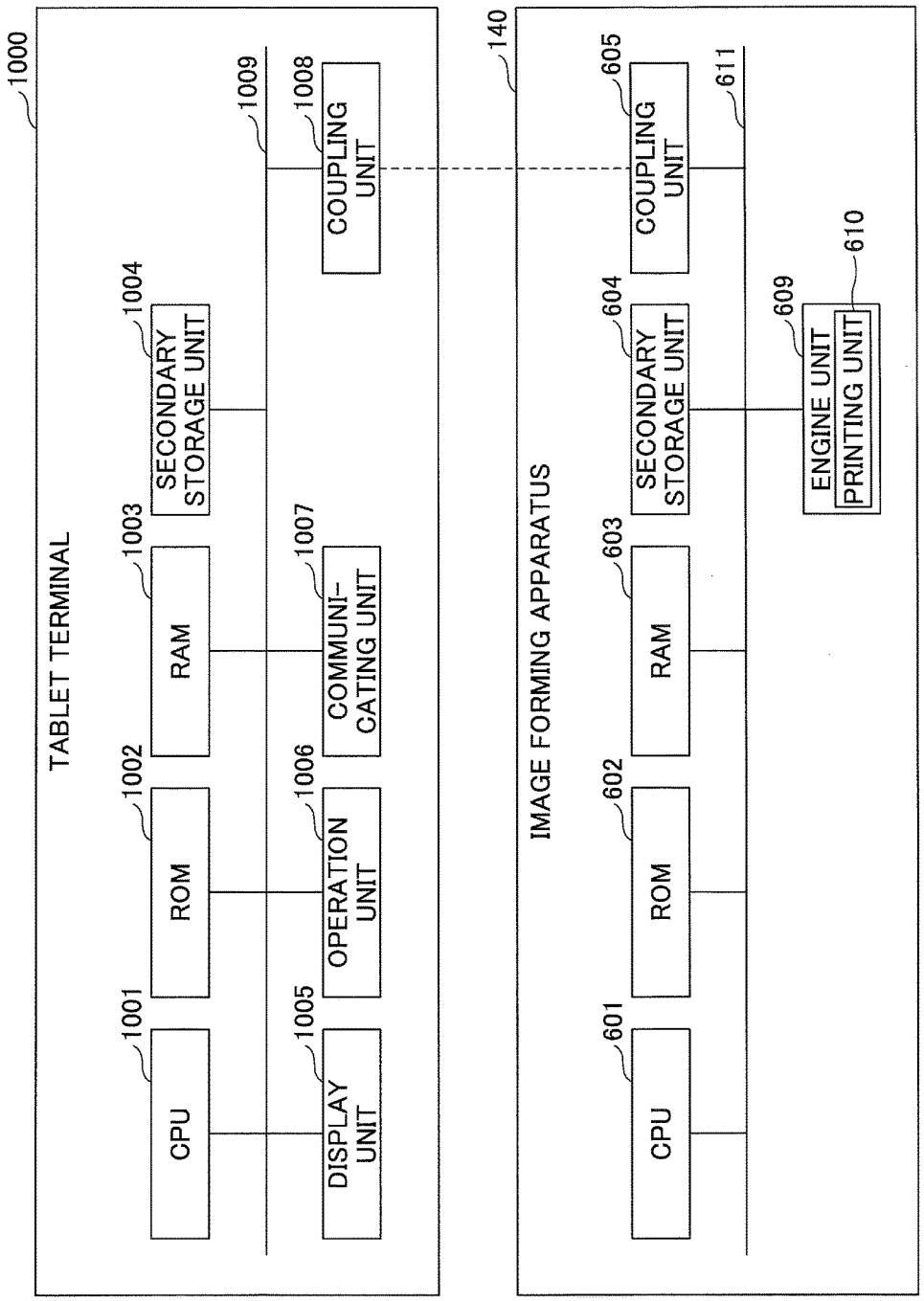
FIG. 10 is an example of a hardware block diagram of a tablet terminal and the image forming apparatus included in the printing process system according to the second embodiment of the present invention.

Next, a description is given of a hardware configuration of the tablet terminal and the image forming apparatus 140 included in the printing process system 180 according to the second embodiment. FIG. 10 is an example of a hardware block diagram of the tablet terminal and the image forming apparatus 140 included in the printing process system 180 according to the second embodiment.

As illustrated in FIG. 10, a tablet terminal 1000 includes a CPU 1001, a ROM 1002, a RAM 1003, and a secondary storage unit 1004. Furthermore, the tablet terminal 1000 includes a display unit 1005, an operation unit 1006, a communicating unit 1007, and a coupling unit 1008. The hardware elements in the tablet terminal 1000 are coupled to each other via a bus 1009.

Note that the hardware elements included in the tablet terminal 1000 are substantially the same as the hardware elements included in the image forming apparatus 140 described with reference to FIG. 6, and therefore detailed descriptions of the hardware elements are omitted.

Furthermore, the hardware elements included in the image forming apparatus 140 illustrated in FIG. 10 are substantially the same as the hardware elements included in the image forming apparatus 140 illustrated in FIG. 6, and therefore descriptions are omitted. Note that in the case of the image forming apparatus 140 illustrated in FIG. 10, the communicating unit 608 is not included. This is because in the second embodiment, communication with the web server 110, etc., is performed by the tablet terminal 1000.

Note that the tablet terminal 1000 and the image forming apparatus 140 may be coupled to each other in a wired manner or in a wireless manner.

<3. Functional Configuration of Printing Process System (Second Embodiment)>

Next, a description is given of a functional configuration of the tablet terminal 1000 included in the printing process system 180.

Figure 11:
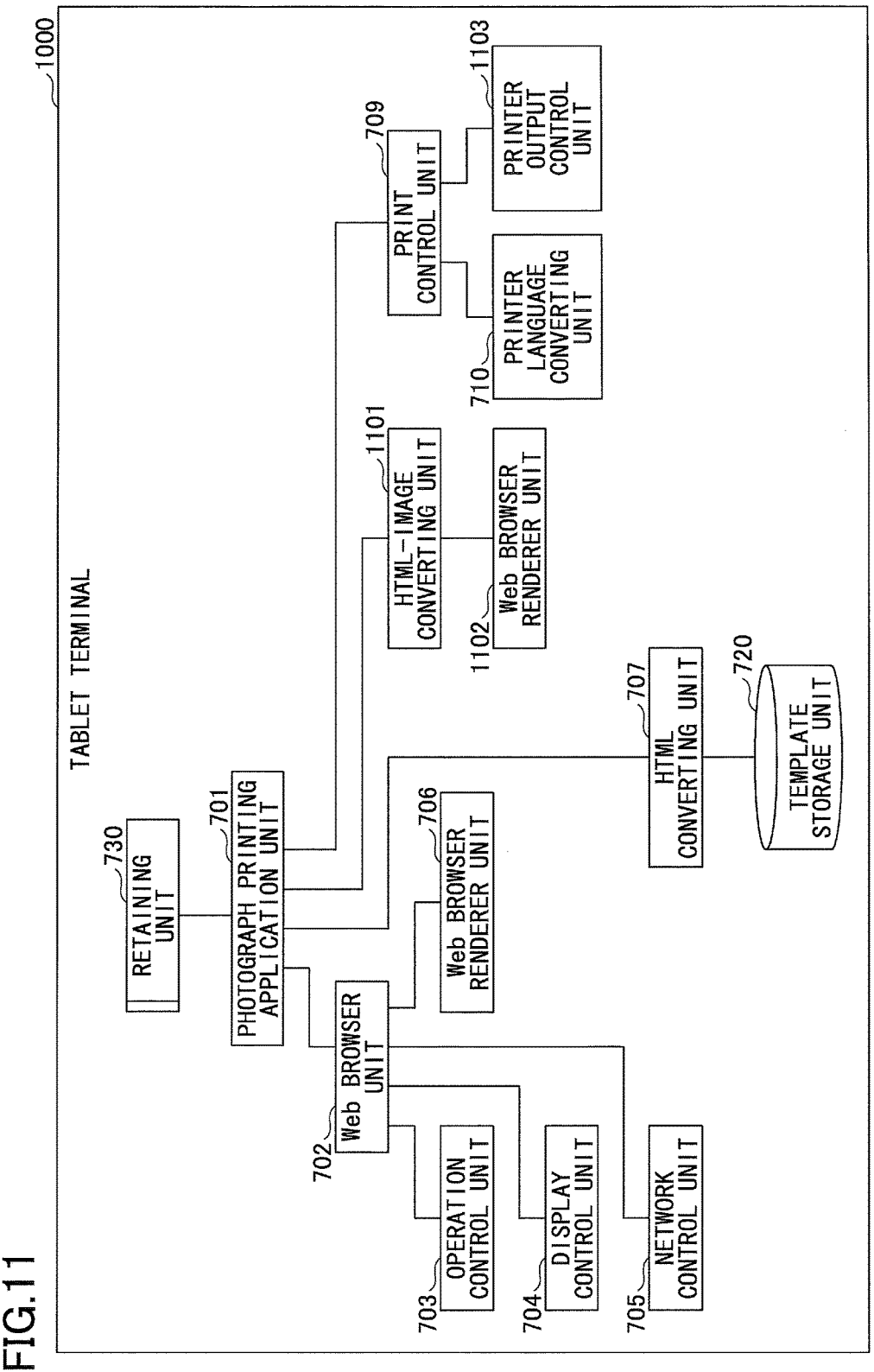
FIG. 11 is an example of a functional block diagram of the tablet terminal according to the second embodiment of the present invention.

FIG. 11 is an example of a functional block diagram of the tablet terminal 1000 included in the printing process system 180. Among the units illustrated in FIG. 11, the same elements as those described with reference to the functional block diagram of FIG. 7 are denoted by the same reference numerals, and descriptions of the same elements are omitted.

As illustrated in FIG. 11, the tablet terminal 1000 includes the photograph printing application unit 701, the web browser unit 702, the operation control unit 703, the display control unit 704, the network control unit 705, the web browser renderer unit 706, and the HTML converting unit 707.

Furthermore, the tablet terminal 1000 includes the print control unit 709 and the printer language converting unit 710. Furthermore, in the present embodiment, the tablet terminal 1000 includes a HTML-image converting unit 1101, a web browser renderer unit 1102, and a printer output control unit 1103.

The HTML-image converting unit 1101 receives a rendering request including the HTML data 302 from the photograph printing application unit 701, and reports the rendering request to the web browser renderer unit 1102. Furthermore, the HTML-image converting unit 1101 receives the image data 303' generated based on the HTML data 302, from the web browser renderer unit 1102. Furthermore, the HTML-image converting unit 1101 reports the received image data 303' to the photograph printing application unit 701. Accordingly, the photograph printing application unit 701 acquires the image data 303'.

The web browser renderer unit 1102 is an example of a second generator, and is a renderer of the same type as the web browser renderer unit 706. When the web browser renderer unit 1102 receives a rendering request including the HTML data 302 from the HTML-image converting unit 1101, the web browser renderer unit 1102 performs a web browser rendering process on the HTML data 302. Furthermore, the web browser renderer unit 1102 reports the image data 303', which has been generated by performing the web browser rendering process, to the HTML-image converting unit 1101.

When the printer output control unit 1103 receives a print request including the PDL data 321 from the print control unit 709, the printer output control unit 1103 sends a print request including the PDL data 321 to the image forming apparatus 140 via the coupling unit 1008.

<4. Flow of Image Forming Process in Printing Process System (Second Embodiment)>

Figure 12:
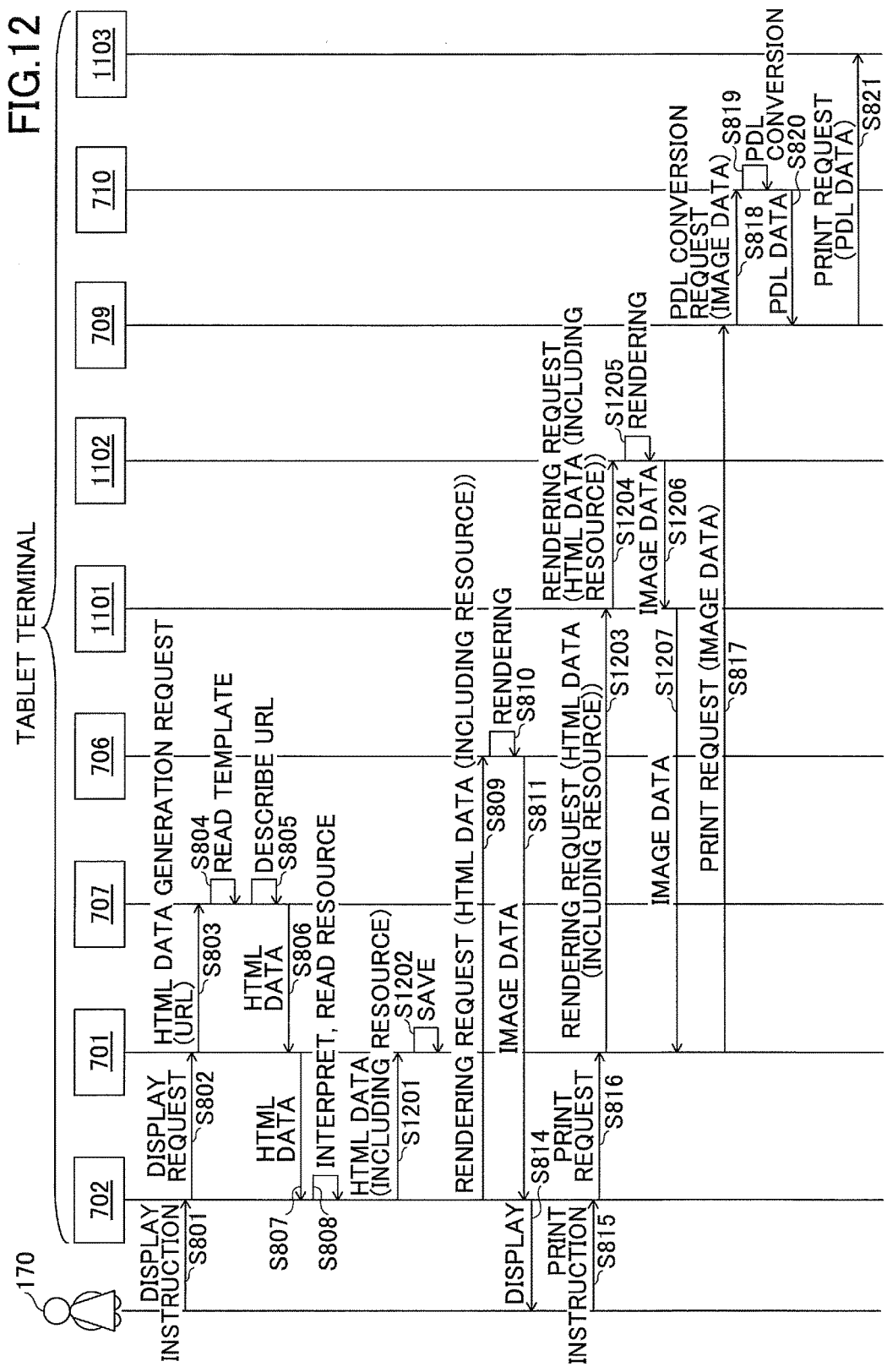
FIG. 12 is a second sequence diagram illustrating the flow of an image forming process in the printing process system according to the second embodiment of the present invention.

Next, a description is given of the flow of an image forming process in the printing process system 180 according to the second embodiment. FIG. 12 is a second sequence diagram illustrating the flow of an image forming process in the printing process system 180. In a state where the thumbnail image list screen 220 is displayed on the tablet terminal 1000, the image forming process illustrated in FIG. 12 is started.

Note that the processes from step S801 to step S808, the processes from step S809 to step S811, the processes from step S814 to step S816, and the processes from step S817 to step S821, are as described above with reference to FIG. 8. Therefore, descriptions of these processes are omitted.

In step S1201, the web browser unit 702 reports the HTML data 302 in which the captured image, etc., is inserted, to the photograph printing application unit 701.

In step S1202, the photograph printing application unit 701 saves the HTML data 302 received from the web browser unit 702, in the retaining unit 730.

In step S1203, the photograph printing application unit 701 reads the HTML data 302, in which the captured image, etc., for which a print request is made is inserted, from the retaining unit 730. Furthermore, the photograph printing application unit 701 reports the rendering request including the HTML data 302 that has been read, to the HTML-image converting unit 1101.

In step S1204, the HTML-image converting unit 1101 reports the received rendering request to the web browser renderer unit 1102.

In step S1205, the web browser renderer unit 1102 performs a web browser rendering process on the HTML data 302 included in the rendering request, and generates the image data 303'.

In step S1206, the web browser renderer unit 1102 reports the generated image data 303' to the HTML-image converting unit 1101.

In step S1207, the HTML-image converting unit 1101 reports the received image data 303' to the photograph printing application unit 701. Accordingly, the photograph printing application unit 701 acquires the image data 303'.

<5. Overview (Second Embodiment)>

As is clear from the above description, the printing process system 180 according to the present embodiment has the following features.

When the web browser unit 702 displays a preview image of the HTML data (content) in which the captured image, etc., is inserted, the photograph printing application unit 701 of the tablet terminal 1000 saves the HTML data in the retaining unit 730.

When a print request is received with respect to the HTML data (content), for which a preview image has been displayed on the display screen of the tablet terminal 1000, the photograph printing application unit 701 reads the HTML data from the retaining unit 730.

A renderer, which is of the same type as the renderer used for generating the image data used for displaying a preview image, is used to perform a rendering process on the HTML data that has been read, and image data is acquired.

The tablet terminal 1000 performs a PDL conversion process on the acquired image data to generate PDL data, and sends the generated PDL data to the image forming apparatus 140.

Accordingly, by the printing process system 180 according to the present embodiment, when printing out an image, it is possible to use a renderer, which is of the same type as the renderer used for displaying a preview image, to perform a rendering process on the HTML data, and generate image data. That is, the image data used for displaying a preview image and the image data used for printing out an image can be matched with each other. As a result, it is possible to reduce displacements between the image obtained by displaying a preview image of the content by the web browser unit 702, and the image of the printed matter obtained by printing out the content.

Third Embodiment

In the second embodiment, in the printing process system 180 including the tablet terminal 1000 and the image forming apparatus 140, the image data used for displaying a preview image and the image data used for printing out an image are generated by the tablet terminal 1000.

However, in a third embodiment, the image data used for displaying a preview image is generated by the tablet terminal 1000 and the image data used for printing out an image is generated by the image forming apparatus 140. In the following, the differences between the third embodiment and the second embodiment are mainly described.

<1. Functional Configuration of Printing Process System (Third Embodiment)>

First, a description is given of a functional configuration of the tablet terminal 1000 and the image forming apparatus 140 included in the printing process system 180.

Figure 13:
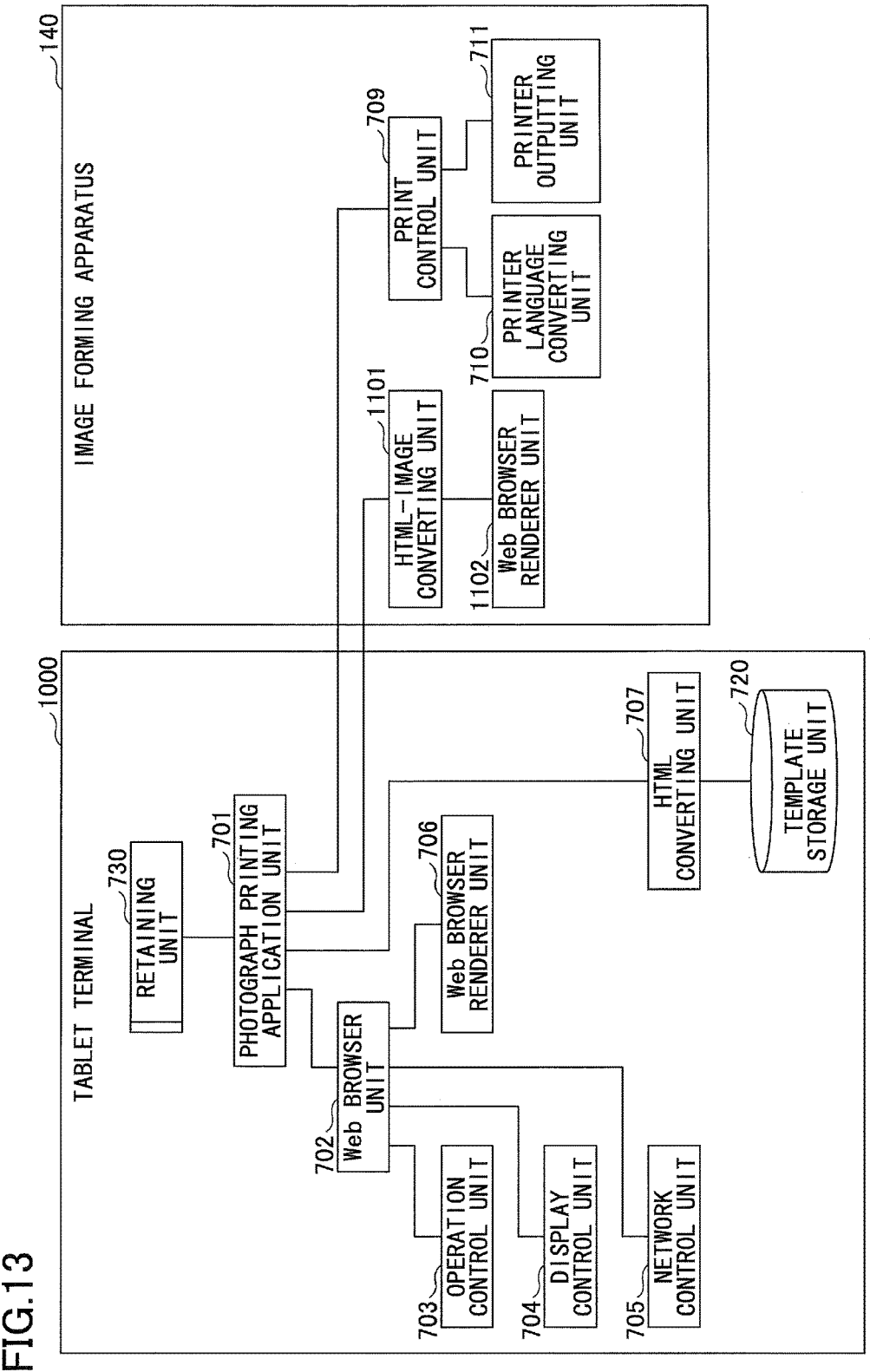
FIG. 13 is an example of a functional block diagram of the tablet terminal and the image forming apparatus included in the printing process system according to a third embodiment of the present invention.

FIG. 13 is an example of a functional block diagram of the tablet terminal 1000 and the image forming apparatus 140 included in the printing process system 180.

As illustrated in FIG. 13, in the present embodiment, the tablet terminal 1000 includes the photograph printing application unit 701, the web browser unit 702, the operation control unit 703, the display control unit 704, and the network control unit 705. Furthermore, the tablet terminal 1000 includes the web browser renderer unit 706 and the HTML converting unit 707.

On the other hand, the image forming apparatus 140 includes the HTML-image converting unit 1101, the web browser renderer unit 1102, the print control unit 709, the printer language converting unit 710, and the printer outputting unit 711.

Note that the units illustrated in FIG. 13 are described above in the functional configurations of FIG. 7 or FIG. 11, and therefore detailed descriptions of the units are omitted.

<2. Flow of Image Forming Process in Printing Process System (Third Embodiment)>

Figure 14:
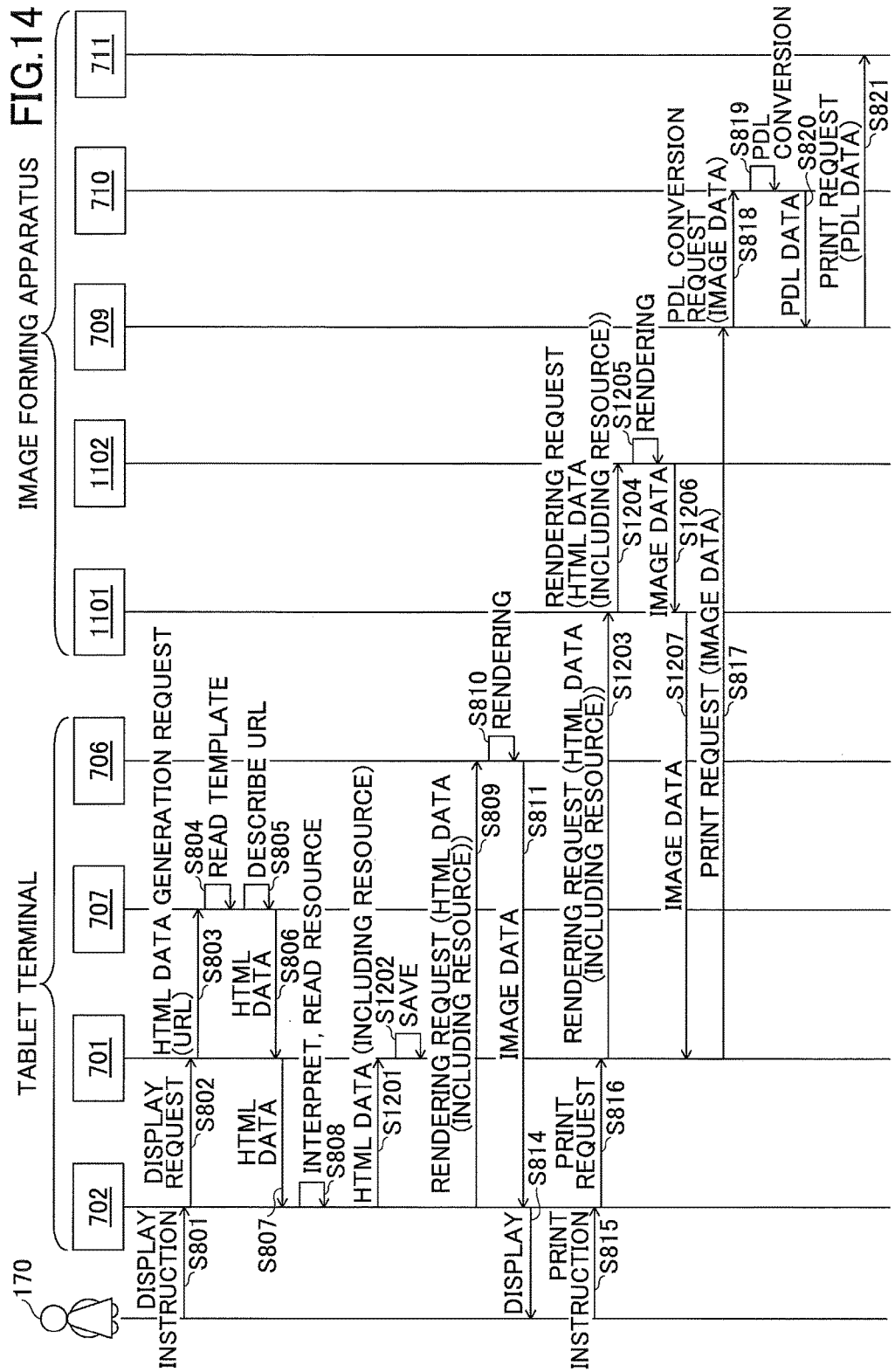
FIG. 14 is a third sequence diagram illustrating the flow of an image forming process in the printing process system according to the third embodiment of the present invention.

Next, a description is given of the flow of an image forming process in the printing process system 180 according to the third embodiment. FIG. 14 is a third sequence diagram illustrating the flow of an image forming process in the printing process system 180. In a state where the thumbnail image list screen 220 is displayed on the tablet terminal 1000, the image forming process illustrated in FIG. 14 is started.

As illustrated in FIG. 14, the image forming process in the printing process system 180 according to the third embodiment is a combination of the image forming process of FIG. 8 and the image forming process of FIG. 12.

Specifically, the processes from step S801 to step S808, the processes from step S809 to step S811, the processes from step S814 to step S816, and the processes from step S817 to step S821, are the same as the image forming process of FIG. 8.

Furthermore, the processes from step S1201 to step S1202 and the processes from step S1203 to step S1207 are the same as the image forming process of FIG. 12. Therefore, detailed descriptions of the processes in FIG. 14 are omitted.

<3. Overview (Third Embodiment)>

As is clear from the above description, the printing process system 180 according to the present embodiment has the following features.

When the web browser unit 702 displays a preview image of the HTML data (content) in which the captured image, etc., is inserted, the photograph printing application unit 701 of the tablet terminal 1000 saves the HTML data in the retaining unit 730.

When a print request is received with respect to the HTML data (content), for which a preview image has been displayed on the display screen of the tablet terminal 1000, the photograph printing application unit 701 reads the HTML data from the retaining unit 730.

A renderer, which is of the same type as the renderer used for generating the image data used for displaying a preview image, is used by the image forming apparatus 140 to perform a rendering process on the HTML data that has been read, and image data is acquired.

The image forming apparatus 140 performs a PDL conversion process on the acquired image data to generate PDL data, and outputs the generated PDL data to the printing unit 610.

Accordingly, by the printing process system 180 according to the present embodiment, it is possible for the tablet terminal 1000 and the image forming apparatus 140 to use the same type of renderer to perform a rendering process on the same HTML data, and generate image data. That is, the image data used for displaying a preview image and the image data used for printing out an image can be matched with each other. As a result, it is possible to reduce displacements between the image obtained by displaying a preview image of the content by the web browser unit 702, and the image of the printed matter obtained by printing out the content.

Fourth Embodiment

In the first through third embodiments, the printing process system 180 includes the display device (or the tablet terminal) and the image forming apparatus.

However, in the fourth embodiment, the printing process system 180 includes one management server (information processing apparatus) and a plurality of display devices (or tablet terminals) and image forming apparatuses managed by the management server.

<1. Configuration of Image Sharing System (Fourth Embodiment)>

Figure 15:
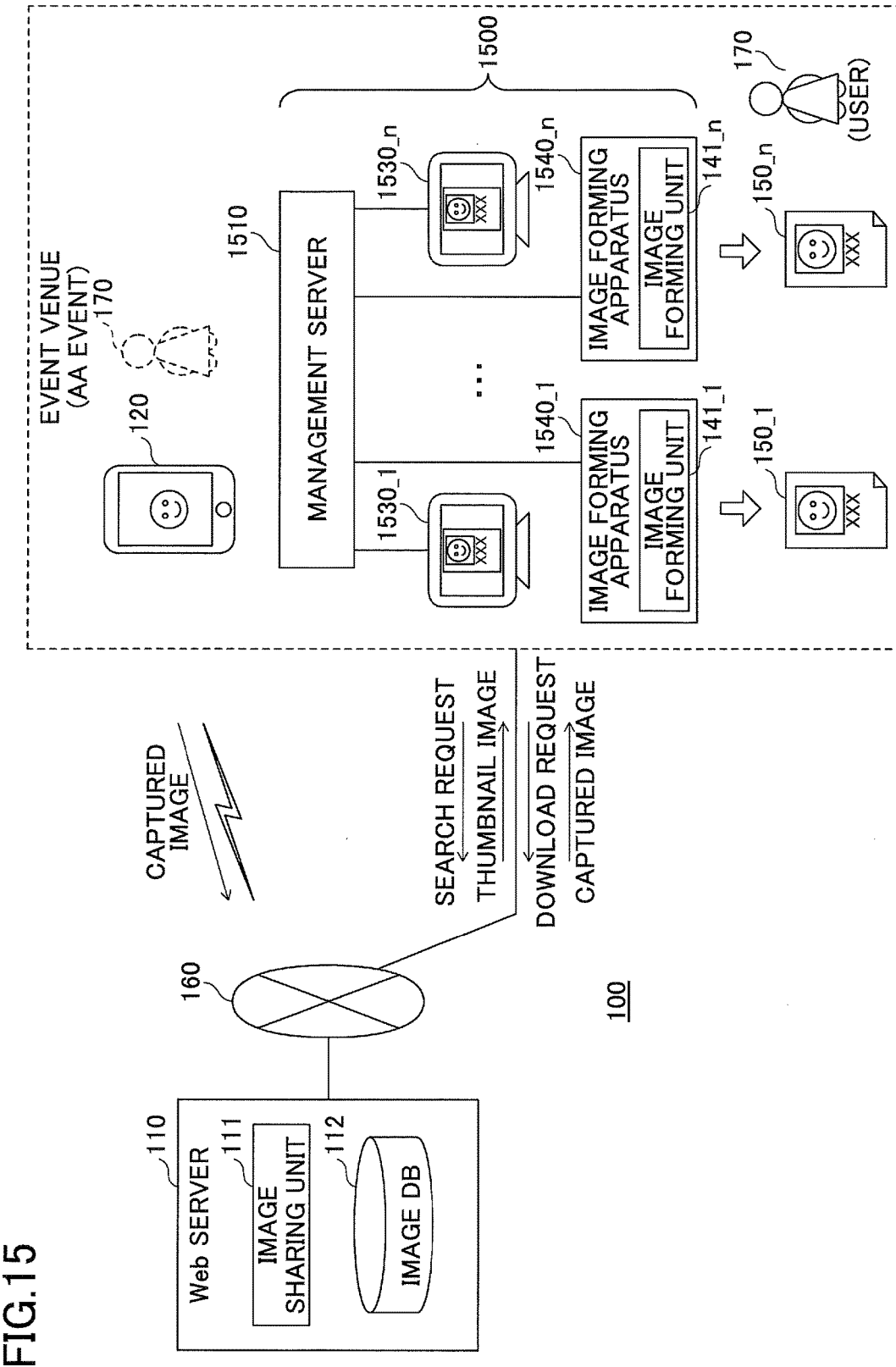
FIG. 15 is a second diagram illustrating an overall configuration of the image sharing system according to a fourth embodiment of the present invention.

First, a description is given of the overall configuration of an image sharing system including the printing process system according to the fourth embodiment. FIG. 15 is a second diagram illustrating an overall configuration of the image sharing system.

Note that the difference between the image sharing system 100 illustrated in FIG. 1 and the image sharing system 100 illustrated in FIG. 15 is the configuration of the printing process system 180. Specifically, in the case of the FIG. 1, the printing process system 180 includes the display device 130 and the image forming apparatus 140 that are coupled to each other. However, in the case of FIG. 15, a printing process system 1500 includes a management server 1510. Furthermore, in the case of FIG. 15, tablet terminals and image forming apparatuses are respectively coupled to the management server 1510 and controlled by the management server 1510.

Note that in the example of FIG. 15, the management server 1510 controls an n number of tablet terminals 1530_1 through 1530_n and an n number of image forming apparatuses 1540_1 through 1540_n. When the printing process system 1500 includes a plurality of tablet terminals and image forming apparatuses, the management server 1510 manages the tablet terminal (for example, the tablet terminal 1530_1) and the image forming apparatus (for example, the image forming apparatus 1540_1) in association with each other.

<2. Functional Configuration of Printing Process System (Fourth Embodiment)>

Next, a description is given of a functional configuration of the management server 1510, the tablet terminal 1530_1, and the image forming apparatus 1540_1 included in the printing process system 1500.

Figure 16:
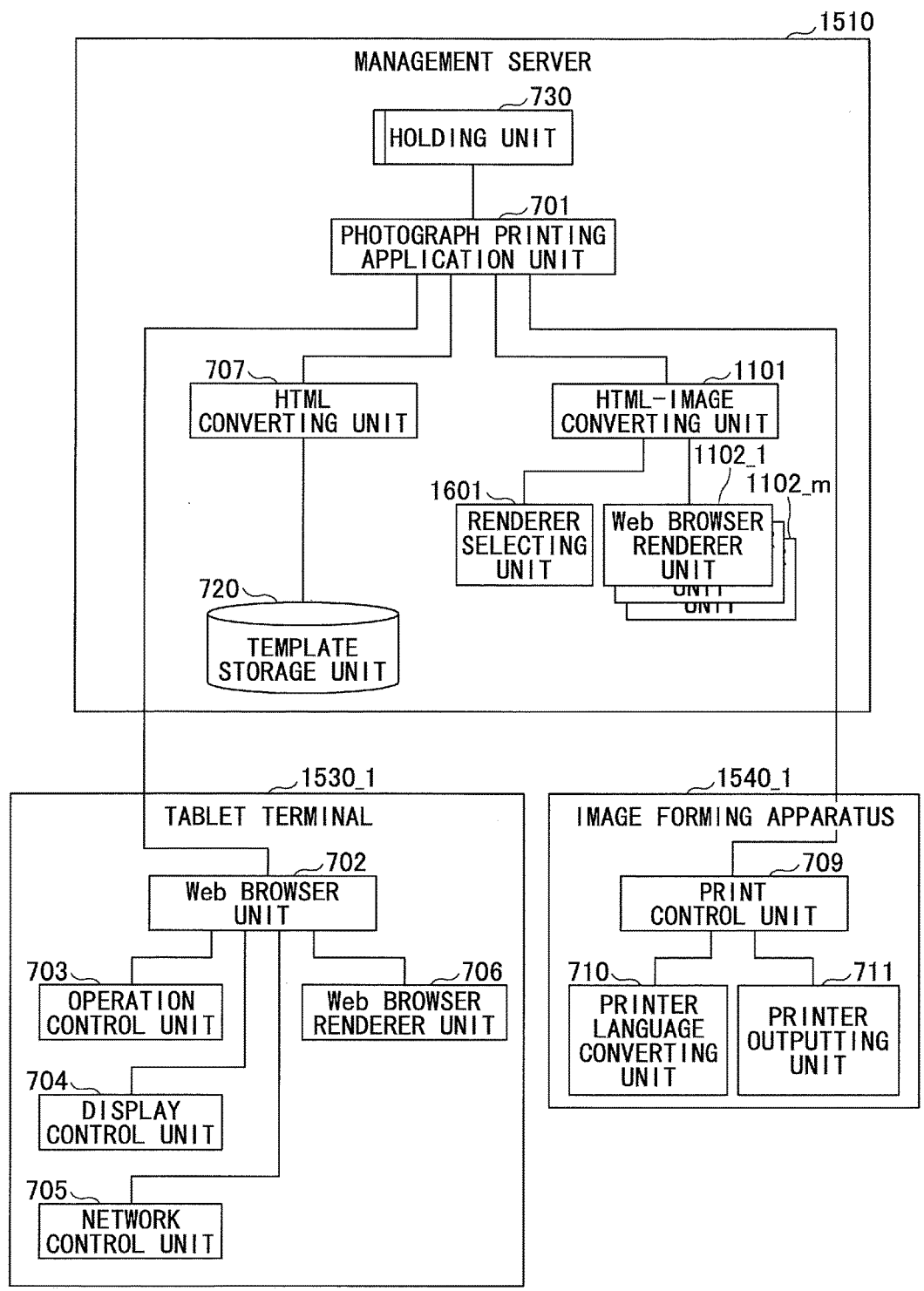
FIG. 16 is an example of a functional block diagram of the management server, the tablet terminal, and the image forming apparatus included in the printing process system according to the fourth embodiment of the present invention.

FIG. 16 is an example of a functional block diagram of the management server 1510, the tablet terminal 1530_1, and the image forming apparatus 1540_1 included in the printing process system 1500. Among the units illustrated in FIG. 16, the same elements as those described with reference to the functional block diagrams of FIGS. 7, 11, and 13 are denoted by the same reference numerals, and descriptions of the same elements are omitted.

As illustrated in FIG. 16, the management server 1510 includes the photograph printing application unit 701, the HTML converting unit 707, the HTML-image converting unit 1101, a renderer selecting unit 1601, and the web browser renderer units 1102_1 through 1102_m.

The renderer selecting unit 1601 is an example of a selector, and receives user_agent information from the web browser unit 702 of the tablet terminal 1530_1, and determines the attribute (type and version) of the web browser unit 702 included in the tablet terminal 1530_1. Furthermore, the renderer selecting unit 1601 selects a web browser renderer unit 1102 according to the determined type and version, from the web browser renderer units 1102_1 through 1102_m.

FIG. 17 is a diagram indicating the types of renderers. In the case of the printing process system 1500 including the plurality of tablet terminals 1530_1 through 1530_n, the web browser renderer units included in the tablet terminals 1530_1 through 1530_n may not always be renderers of the same type, and a plurality of types of renderers may be included in the tablet terminals 1530_1 through 1530_n. On the other hand, as illustrated in FIG. 17, the type of renderer can be identified based on the type and the version of the web browser unit. Therefore, the renderer selecting unit 1601 determines the type and the version of the web browser unit 702 based on the user_agent information sent from the web browser unit 702. Then, the renderer selecting unit 1601 selects a web browser renderer unit from among the web browser renderer units 1102_1 through 1102_m, according to the determined type and version.

Accordingly, the management server 1510 can use a renderer, which is of the same type as the web browser renderer units provided in the respective ones of the plurality of tablet terminals 1530_1 through 1530_n, to generate image data used for printing out an image.

Referring back to FIG. 16, the tablet terminal 1530_1 includes the web browser unit 702, the operation control unit 703, the display control unit 704, the network control unit 705, and the web browser renderer unit 706.

Furthermore, the image forming apparatus 1540_1 includes the print control unit 709, the printer language converting unit 710, and the printer outputting unit 711.

By the above configurations, the image data, which is generated at the management server 1510 based on the print request sent from the tablet terminal 1530_1, is sent to the image forming apparatus 1540_1 associated with the tablet terminal 1530_1, and an image is printed out based on the image data.

<3. Flow of Image Forming Process in Printing Process System (Fourth Embodiment)>

Next, a description is given of the flow of an image forming process in the printing process system 1500 according to the fourth embodiment. FIG. 18 is a fourth sequence diagram illustrating the flow of an image forming process in the printing process system 1500. Note that the processes from when the thumbnail image list screen 220 is displayed to when the preview screen 230 is displayed are the same as the processes of step S801 to step S808, step S1201 to step S1202, and step S809 to step S814 of FIG. 12 or FIG. 14, and therefore descriptions of these processes in FIG. 18 are omitted.

In a state where the preview screen 230 is displayed on the tablet terminal 15301, the image forming process illustrated in FIG. 18 is started.

In step S815, when the user 170 taps the print button 232 and inputs a print instruction, the web browser unit 702 of the tablet terminal 1530_1 accepts the print instruction.

In step S816, the web browser unit 702, which has accepted the print instruction, sends a print request to the photograph printing application unit 701. At this time, the web browser unit 702 sends the print request including the user_agent information.

In step S1801, the photograph printing application unit 701 of the management server 1510, which has received the print request, reads the HTML data 302 in which the captured image, etc., for which the print request has been made is inserted, from the retaining unit 730. Furthermore, the photograph printing application unit 701 extracts the user_agent information included in the received print request. Furthermore, the photograph printing application unit 701 reports a rendering including the HTML data 302 that has been read and the user_agent information that has been extracted, to the HTML-image converting unit 1101.

In step S1802, the HTML-image converting unit 1101, which has received the rendering request, reports a renderer selection request including the user_agent information to the renderer selecting unit 1601.

The renderer selecting unit 1601, which has received the renderer selection request, determines the type and the version of the web browser unit 702 of the tablet terminal 1530_1, based on the user_agent information, and selects a web browser renderer unit according to the determination result.

In step S1803, the renderer selecting unit 1601 reports the selection result to the HTML-image converting unit 1101.

In step S1804, the HTML-image converting unit 1101, which has received the selection result from the renderer selecting unit 1601, reports a rendering request including the HTML data 302, to the web browser renderer unit according to the selection result. Here, the HTML-image converting unit 1101 reports the rendering request to the web browser renderer unit 1102_1.

In step S1205, the web browser renderer unit 1102_1, which has received the rendering request, performs a web browser rendering process on the HTML data 302 included in the rendering request, and generates the image data 303'.

In step S1206, the web browser renderer unit 1102_1 reports the generated image data 303' to the HTML-image converting unit 1101. In step S1207, the HTML-image converting unit 1101, which has received the image data 303', reports the image data 303' to the photograph printing application unit 701. Accordingly, the photograph printing application unit 701 acquires the image data 303'.

The subsequent processes of step S817 to step S821 are the same as the processes of S817 to step S821 of FIG. 12 or FIG. 14, and therefore descriptions of these processes are omitted.

<4. Overview (Fourth Embodiment)>

As is clear from the above description, the printing process system 1500 according to the present embodiment has the following features.

When the web browser unit 702 of the tablet terminal 1530_1 displays a preview image of the HTML data (content) in which a captured image, etc., is inserted, the photograph printing application unit 701 of the management server 1510 saves the HTML data in the retaining unit 730.

When a print request is received with respect to the HTML data (content), for which a preview image has been displayed on the display screen of the tablet terminal 1530_1, the photograph printing application unit 701 of the management server 1510 reads the HTML data from the retaining unit 730.

The management server 1510 determines the type of the renderer, which has been used when generating the image data to be used for displaying a preview image, based on the user_agent information included in the print request.

A renderer, which is of the determined type, is used by the management server 1510 to perform a rendering process on the HTML data that has been read, and image data is acquired.

The image forming apparatus 1540_1 performs a PDL conversion process on the acquired image data to generate PDL data, and outputs the generated PDL data to the printing unit 610.

Accordingly, by the printing process system 1500 according to the present embodiment, it is possible for the management server 1510 to select a renderer of the same type as the renderer provided in the tablet terminal 1530_1, use the selected renderer to perform a rendering process on the same HTML data, and generate image data. That is, the image data used for displaying a preview image and the image data used for printing out an image can be matched with each other. As a result, it is possible to reduce displacements between the image obtained by displaying a preview image of the content by the web browser unit 702, and the image of the printed matter obtained by printing out the content.

Other Embodiments

In the first embodiment described above, the functional units in the image forming unit 141 are realized in the image forming apparatus 140; however, some of the functional units in the image forming unit 141 may be realized by the tablet terminal 1000 and the other functional units in the image forming unit 141 may be realized by the image forming apparatus 140.

Furthermore, in the second embodiment described above, two renderers of the same type (the web browser renderer unit 706 and the web browser renderer unit 1102) are included in the tablet terminal 1000. However, two renderers of the same type may be included in the image forming apparatus 140.

As described above, the functional units illustrated in FIGS. 7, 11, and 13 may be realized by one device or by a plurality of devices. Furthermore, when realizing the functions by plurality of devices, any of the functions may be realized by any of the devices.

Furthermore, in the printing process system 1500 according to the fourth embodiment described above, the number of tablet terminals and the number of image forming apparatuses are the same; however, the number of tablet terminals and the number of image forming apparatuses do not have to be the same.

Furthermore, in the fourth embodiment described above, the print control unit 709, the printer language converting unit 710, and the printer outputting unit 711 are realized in the image forming apparatus 1540_1; however, these functions may be realized in the management server 1510. In this case, the PDL data 321 according to the image data 303' is output from the management server 1510 to the image forming apparatus 1540_1.

Furthermore, in the fourth embodiment described above, the management server 1510 is installed at an event venue; however, the management server 1510 may be installed at other locations. In this case, the tablet terminals 1530_1 through 1530_n and the management server 1510 may be coupled to each other via the network 160. Furthermore, the image forming apparatuses 1540_1 through 1540_n and the management server 1510 may be coupled to each other via the network 160.

Furthermore, in the first through fourth embodiments described above, HTML data is described as an example of the content displayed by the web browser unit 702; Cascading Style Sheets (CSS) may be applied to the HTML data.

Furthermore, in the second through fourth embodiments described above, the printing process system includes a tablet terminal and an image forming apparatus; however, instead of the tablet terminal, a terminal other than a tablet terminal may be included in the printing process system.

According to one embodiment of the present invention, it is possible to reduce the displacement between an image obtained by displaying content by a web browser and an image obtained by printing out the content.

The printing process system and the information processing apparatus are not limited to the specific embodiments described in the detailed description, and variations and modifications may be made without departing from the spirit and scope of the present invention.

What is claimed is:

1. A printing process system comprising:
a circuitry configured to
render content to generate image data to be used for displaying the content by a web browser;
accept a print instruction to print out the content, which is displayed by the web browser by using the generated image data, the print instruction being input by a user via a display device coupled to the printing process system; and
convert the generated image data into page description language data, and output the page description language data to a printer configured to print an image which matches an image of the content displayed by the web browser, wherein the image data used for displaying the content by the web browser is identical to the generated image data to be converted into the page description language data.

2. The printing process system according to claim 1, wherein the circuitry is further configured to
retain the generated image data; and
convert the retained image data into the page description language data and output the page description language data to the printer.

3. The printing process system according to claim 1, wherein the circuitry is configured to convert the image data into the page description language data, thereby omitting another rendering process only for printing the image.

4. The printing process system according to claim 1, wherein the image data used for displaying the content by the web browser and the generated image data to be converted into the page description language data are generated by a renderer of the same web browser.

5. A printing process system comprising:
a circuitry configured to
render content, by a first generator, to generate image data to be used for displaying the content by a web browser;

accept a print instruction to print out the content, which is displayed by the web browser by using the generated image data, the print instruction being input by a user via a display device coupled to the printing process system;

render the content, by a second generator using the same method as a method used by the first generator, to generate the image data; and convert the image data, which has been generated by the second generator, into page description language data, and output the page description language data to a printer configured to print an image which matches an image of the content displayed by the web browser, wherein the image data used for displaying the content by the web browser is identical to the image data to be converted into the page description language data.

6. The printing process system according to claim 5, wherein the circuitry is further configured to select, from among a plurality of the second generators, the second generator that corresponds to an attribute of the web browser displaying the content by using the image data generated by the first generator; and convert the image data, which has been generated by the selected second generator, into the page description language data, and output the page description language data to the printer.

7. The printing process system according to claim 5, wherein the circuitry is further configured to describe information, which indicates a predetermined storage destination of a resource, in a template described in a predetermined markup language, to convert the template into the content, when a display request to display the resource stored in the predetermined storage destination is received;

read the resource based on the information indicating the predetermined storage destination described in the content converted from the template, and insert the resource into the content, and render, by the first generator, the content in which the resource has been inserted, to generate the image data to be used for displaying the content by the web browser.

8. An information processing apparatus comprising:

a circuitry configured to render content, by one of a plurality of generators, to generate image data to print out the content, when a print instruction to print out the content is received, the generated image data corresponding to image data used for displaying the content by a web browser, the content being rendered by a method that is the same as a method used for generating the image data used for displaying the content by the web browser, the print instruction being input by a user via a display device coupled to the information processing apparatus;

select the one of the plurality of generators that corresponds to information relating to an attribute of the web browser, from among the plurality of generators, the information relating to the attribute being extracted from the received print instruction; and output data, by converting the generated image data into page description language data by the selected one of the plurality of generators, to an image forming apparatus associated with a terminal including the web browser, the image forming apparatus being configured to print an image which matches an image of the content displayed by the web browser, wherein the image data used for displaying the content by the web browser is identical to the image data to be converted into the page description language data.

* * * * *